United States Patent
Luo et al.

(10) Patent No.: US 12,335,741 B2
(45) Date of Patent: Jun. 17, 2025

(54) NETWORK SLICE REDIRECTION METHOD AND APPARATUS

(71) Applicant: HUAWEI TECHNOLOGIES CO., LTD., GuangDong (CN)

(72) Inventors: Haiyan Luo, Shenzhen (CN); Qinghai Zeng, Shanghai (CN); Fei Sun, Shanghai (CN); Feng Han, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 17/871,592

(22) Filed: Jul. 22, 2022

(65) Prior Publication Data
US 2022/0360996 A1  Nov. 10, 2022

Related U.S. Application Data

(63) Continuation of application No. PCT/CN2020/074023, filed on Jan. 23, 2020.

(51) Int. Cl.
*H04W 16/10* (2009.01)
*H04W 36/00* (2009.01)
*H04W 36/04* (2009.01)
*H04W 36/08* (2009.01)

(52) U.S. Cl.
CPC .......... *H04W 16/10* (2013.01); *H04W 36/04* (2013.01); *H04W 36/13* (2023.05); *H04W 36/08* (2013.01)

(58) Field of Classification Search
None
See application file for complete search history.

(56) References Cited

U.S. PATENT DOCUMENTS

| | | | |
|---|---|---|---|
| 2017/0070892 A1* | 3/2017 | Song | .......... H04L 41/042 |
| 2018/0124660 A1 | 5/2018 | Zhang et al. | |
| 2020/0022061 A1 | 1/2020 | Jin et al. | |
| 2020/0344679 A1 | 10/2020 | Jin et al. | |
| 2021/0321264 A1 | 10/2021 | Lou et al. | |

FOREIGN PATENT DOCUMENTS

| | | |
|---|---|---|
| CN | 108924926 A | 11/2018 |
| CN | 110291837 A | 9/2019 |

(Continued)

OTHER PUBLICATIONS

Intel Corporation: "Slicing solution comparison and selection", 3GPP Draft; R3-170241,Jan. 12, 2017, XP051212903, total 6 pages.

(Continued)

*Primary Examiner* — Minh Trang T Nguyen
(74) *Attorney, Agent, or Firm* — Rimon PC

(57) ABSTRACT

A radio access network (RAN) device receives a first message, where the first message includes identifiers of one or more first network slices, and the identifiers of the one or more first network slices are included in a non-access stratum (NAS) request message sent by a terminal device to a core network (CN) device by using the RAN device. The RAN device sends a second message including network slice redirection information to the terminal device, where the network slice redirection information includes at least one of network slice remapping information or terminal device redirection information, and the network slice redirection information is obtained after the RAN device performs network slice redirection decision-making on the one or more first network slices.

20 Claims, 12 Drawing Sheets

(56) References Cited

FOREIGN PATENT DOCUMENTS

| CN | 110431889 A | 11/2019 |
|---|---|---|
| WO | 2018083664 A1 | 5/2018 |
| WO | 2018180871 A1 | 10/2018 |
| WO | 2019036494 A1 | 2/2019 |

OTHER PUBLICATIONS

Huawei Hisilicon: "Slice Availability and Discovery in RAN", 3GPP Draft; R2-167586,Nov. 13, 2016, XP051177453, total 3 pages.
LG Electronics Inc: "Mobility procedure considering network slice", 3GPP Draft; R3-171129, Apr. 3, 2017, XP051245848, total 4 pages.
Huawei et al., "RRC Support for Network Slicing", 3GPP TSG-RAN WG2#97 R2-1701216, Feb. 17, 2017,total 4 pages.
3GPP TS 23.502 V16.3.0 (Dec. 2019), 3rd Generation Partnership Project; Technical Specification Group Services and System Aspects; Procedures for the 5G System (5GS); Stage 2(Release 16), 558 pages.
3GPP TS 38.413 V16.0.0:"3rd Generation Partnership Project;Technical Specification Group Radio Access Network; NG-RAN;NG Application Protocol (NGAP)(Release 16)",Dec. 2019,total 335 pages.
SA WG2 Meeting #136 Ad-hoc,S2-2000691,Key Issue on 5GC assisted cell selection to access network slice , Samsung, ATandT, Sprint, InterDigital, China Mobile, SK Telecom, Convida Wireless, ZTE , Jan. 13 17, 2020, Incheon, Korea,total 4 pages.

\* cited by examiner

NETWORK SLICE REDIRECTION METHOD AND APPARATUS

CROSS-REFERENCE TO RELATED APPLICATIONS

This application is a continuation of International Application No. PCT/CN2020/074023, filed on Jan. 23, 2020, the disclosure of which is hereby incorporated by reference in its entirety.

TECHNICAL FIELD

The present invention relates to the wireless communication field, and in particular, to a network slice redirection method and an apparatus.

BACKGROUND

With rapid development of wireless communication technologies, a 5th generation (5G) wireless communication technology has become a popular subject in the industry currently. 5G supports a variety of application requirements, for example, an access capability characterized by higher-rate experience and higher bandwidth, information exchange characterized by a lower latency and high reliability, and larger-scale and low-cost access and management of machine-type communication devices. Key factors for 5G application include supporting ubiquitous requirements of various vertical industries and ensuring energy saving.

In view of this, an important concept of network slice is introduced in 5G. A network slice is a combination of network functions implementing a communication service and a network capability and corresponding resource requirements. A network slice includes a core network (CN) part and a radio access network (RAN) part. A network slice forms an end-to-end logical network to meet a performance requirement of one or more network services of a slice demand side. A plurality of network slices are deployed in one CN to meet requirements of different users and different services. One RAN may support a plurality of network slices. Usually, a network slice supported by a cell controlled by one RAN device is a subset of a network slice deployed by a CN, and network slices supported by cells controlled by different RAN devices may also be different.

In an existing 3GPP technical specification, it is assumed that all cells in a large physical area (for example, a tracking area or a registration area in a mobile network) have a same network slice support capability, that is, the cells in the same area support a same network slice. However, in an actual system, different cells in a network may have different network slice support capabilities. In this case, there may be a problem when a terminal device can access a required network slice in one cell but cannot access the required network slice in another neighboring cell. Different network slice support capabilities of different cells cause unstable network slice access efficiency of the terminal device. Currently, there is no appropriate solution to improving efficiency of accepting, by cells with different network slice support capabilities, a network slice request initiated by a terminal device.

SUMMARY

Embodiments of this application provide a network slice redirection method, to effectively improve network slice access efficiency of a terminal device.

The following describes this application from a plurality of aspects. It is easy to understand that implementations of the plurality of aspects may be mutually referenced.

According to a first aspect, this application provides a network slice redirection method. The method includes: A radio access network (RAN) device receives a first message, where the first message includes identifiers of one or more first network slices, and the identifiers of the one or more first network slices are the same as identifiers that are of the one or more first network slices and that are included in a first non-access stratum (NAS) request message sent by a terminal device to a core network (CN) device by using the RAN device; and the RAN device sends a second message to the terminal device, where the second message includes network slice redirection information, the network slice redirection information includes at least one of network slice remapping information and terminal device redirection information, and the network slice redirection information is obtained after the RAN device performs network slice redirection decision-making on the one or more first network slices.

It can be learned that according to the method provided in embodiments of this application, after receiving a request for a network slice, the RAN device performs the network slice redirection decision-making and notifies the terminal device, so that the terminal device can reinitiate the request based on the network slice redirection information. This improves network slice access efficiency.

In a possible implementation, the network slice remapping information includes at least one of the following information: identifiers of one or more second network slices to which the one or more first network slices are remapped, correspondences between the identifiers of the one or more first network slices and the identifiers of the one or more second network slices that are remapped to, the identifiers of the plurality of second network slices and a priority of each second network slice, timer information of the one or more second network slices, or the identifiers of the plurality of second network slices and the timer information corresponding to each second network slice.

In a possible implementation, the terminal device redirection information includes at least one of the following information: an identifier of a cell to which the terminal device is redirected, information about a carrier to which the terminal device is redirected, the information about the carrier to which the terminal device is redirected and the identifier of the cell, or an identifier of an area to which the terminal device is redirected.

In a possible implementation, the method further includes: The RAN device performs the network slice redirection decision-making based on network slice redirection policy information, where a network slice redirection policy includes at least one of network slice remapping and terminal device redirection.

In a possible implementation, that a RAN device receives a first message includes: The RAN device receives the first message sent by the terminal device, where the first message includes the first NAS request message and the identifiers of the one or more first network slices.

In this step, signaling is exchanged only between the terminal device and the RAN device. This reduces signaling overheads and shortens an access delay.

In a possible implementation, that a RAN device receives a first message includes: The RAN device receives the first message sent by the CN device, where the first message includes a response message for the first NAS request message and the identifiers of the one or more first network slices.

In this step, the terminal device does not need to send an AS stratum request message to the RAN device. This enhances backward compatibility for the terminal device.

In a possible implementation, the second message further includes the response message for the first NAS request message.

In a possible implementation, the method further includes: The RAN device receives a second NAS request message sent by the terminal device, where the second NAS request message includes the identifiers of the one or more second network slices, or the identifiers of the one or more first network slices and the identifiers of the one or more second network slices.

In a possible implementation, the method further includes: The RAN device obtains the network slice redirection policy information from the CN device.

According to a second aspect, this application provides a network slice redirection method. The method includes: A terminal device sends a first request message, where the first request message includes identifiers of one or more first network slices, and the identifiers of the one or more first network slices are the same as identifiers that are of the one or more first network slices and that are included in a first non-access stratum (NAS) request message sent by the terminal device to a core network (CN) device by using a radio access network (RAN) device; and the terminal device receives a second message from the RAN device, where the second message includes network slice redirection information, and the network slice redirection information includes at least one of network slice remapping information and terminal device redirection information.

It can be learned that according to the method provided in embodiments of this application, after receiving a request for a network slice, the RAN device performs the network slice redirection decision-making and notifies the terminal device, so that the terminal device can reinitiate the request based on the network slice redirection information. This improves network slice access efficiency.

In a possible implementation, the network slice remapping information includes at least one of the following information: identifiers of one or more second network slices to which the one or more first network slices are remapped, correspondences between the identifiers of the one or more first network slices and the identifiers of the one or more second network slices that are remapped to, the identifiers of the plurality of second network slices and a priority of each second network slice, timer information of the one or more second network slices, or the identifiers of the plurality of second network slices and the timer information corresponding to each second network slice.

In a possible implementation, the terminal device redirection information includes at least one of the following information: an identifier of a cell to which the terminal device is redirected, information about a carrier to which the terminal device is redirected, the information about the carrier to which the terminal device is redirected and the identifier of the cell, or an identifier of an area to which the terminal device is redirected.

In a possible implementation, that a terminal device sends a first request message includes: The terminal device sends the first request message to the RAN device, where the first request message includes the first NAS request message and the identifiers of the one or more first network slices.

In this step, signaling is exchanged only between the terminal device and the RAN device. This reduces signaling overheads and shortens an access delay.

In a possible implementation, that a terminal device sends a first request message includes: The terminal device sends the first request message to the CN device, where the first message includes the first NAS request message.

In this step, the terminal device does not need to send an AS stratum request message to the RAN device. This enhances backward compatibility for the terminal device.

In a possible implementation, the second message further includes a response message for the first NAS request message.

In a possible implementation, the method further includes: The terminal device sends a second NAS request message to the RAN device, where the second NAS request message includes the identifiers of the one or more second network slices, or the identifiers of the one or more first network slices and the identifiers of the one or more second network slices.

According to a third aspect, this application provides a network slice redirection method. The method includes: A radio access network (RAN) device receives a first message, where the first message includes identifiers of one or more first network slices, and the identifiers of the one or more first network slices are the same as identifiers that are of the one or more first network slices and that are included in a first non-access stratum (NAS) request message sent by a terminal device to a core network (CN) device by using the RAN device; the RAN device sends a second message to the CN device, where the second message includes network slice remapping information, and the network slice remapping information is obtained after the RAN device performs network slice redirection decision-making on the one or more first network slices; and the RAN device receives a response message that is for the second message and that is sent by the CN device.

It can be learned that according to the method provided in embodiments of this application, after receiving a request of the terminal device, the RAN device performs network slice remapping decision-making and notifies the CN device, so that an appropriate resource can be quickly allocated between the RAN device and the CN device to accept the request of the terminal device.

In a possible implementation, the network slice remapping information includes at least one of the following information: identifiers of one or more second network slices to which the one or more first network slices are remapped, correspondences between the identifiers of the one or more first network slices and the identifiers of the one or more second network slices that are remapped to, the identifiers of the plurality of second network slices and a priority of each second network slice, timer information of the one or more second network slices, or the identifiers of the plurality of second network slices and the timer information corresponding to each second network slice.

In a possible implementation, the method further includes: The RAN device performs network slice mapping decision-making based on network slice redirection policy information.

In a possible implementation, that a RAN device receives a first message includes: The RAN device receives the first message sent by the terminal device, where the first message includes the first NAS request message and the identifiers of the one or more first network slices.

In this step, signaling is exchanged only between the terminal device and the RAN device. This reduces signaling overheads and shortens an access delay.

In a possible implementation, that a RAN device receives a first message includes: The RAN device receives the first message sent by the CN device, where the first message includes a response message for the first NAS request message and the identifiers of the one or more first network slices.

In this step, the terminal device does not need to send an AS stratum request message to the RAN device. This enhances backward compatibility for the terminal device.

In a possible implementation, the method further includes: The RAN device obtains the network slice redirection policy information from the CN device.

According to a fourth aspect, a radio access network (RAN) device is provided. The radio access network device is configured to perform the method according to any one of the first aspect or the possible implementations of the first aspect, or any one of the third aspect or the possible implementations of the third aspect. For example, the RAN device may include a unit configured to perform the method according to any one of the first aspect or the possible implementations of the first aspect, or any one of the third aspect or the possible implementations of the third aspect.

According to a fifth aspect, a terminal device is provided. The terminal device is configured to perform the method according to any one of the second aspect or the possible implementations of the second aspect. Specifically, the terminal device may include a unit configured to perform the method according to any one of the second aspect or the possible implementations of the second aspect.

According to a sixth aspect, a computer program product is provided. The computer program product includes computer program code. When the computer program code is run by a communication unit and a processing unit, or a transceiver and a processor of a communication device (for example, an access network device or a terminal device), the communication device is enabled to perform the method according to any one of the first to the third aspects or the possible implementations of the first to the third aspects.

According to a seventh aspect, a computer-readable storage medium is provided. The computer-readable storage medium stores a program. The program enables a computer to perform the method according to any one of the first to the third aspects or the possible implementations of the first to the third aspects.

According to an eighth aspect, an embodiment of this application provides a chip. The chip is coupled to a memory, and performs the method according to any one of the first aspect or the possible designs of the first aspect, any one of the second aspect or the possible designs of the second aspect, or any one of the third aspect or the possible designs of the third aspect of embodiments of this application.

These aspects or another aspect of the present invention may be clearer and more intelligible in descriptions in the following (plurality of) embodiments.

BRIEF DESCRIPTION OF DRAWINGS

The following briefly describes the accompanying drawings used in embodiments of this application or a current technology.

DESCRIPTION OF EMBODIMENTS

The following describes embodiments of this application with reference to the accompanying drawings in embodiments of this application.

In this application, the word "example" is used to represent "giving an example, an illustration, or a description". Any embodiment described as an "example" in this application should not be explained as being more preferred or having more advantages than another embodiment. For the purpose that any person skilled in the art can implement and use the present invention, the following descriptions are provided. In the following descriptions, details are listed for the purpose of explanation. It should be understood that, a person of ordinary skill in the art may learn that the present invention can also be implemented without using these specific details. In other examples, well-known structures and processes are not described in detail, to avoid obscuring the descriptions of the present invention with unnecessary details. Therefore, the present invention is not limited to the described embodiments but extends to the widest scope that complies with the principles and features disclosed in this application.

In this specification, the claims, and the accompanying drawings of this application, terms "first", "second", "third", "fourth", and the like (if existent) are intended to distinguish between similar objects but do not necessarily indicate a specific order or sequence. It should be understood that the data termed in such a way are interchangeable in appropriate circumstances so that embodiments of this application described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

The terms "system" and "network" in this specification may be used interchangeably in this specification.

Examples are used in the following to describe in detail technical solutions of the present invention. The following embodiments may be combined with each other, and a same or similar concept or process may not be described repeatedly in some embodiments.

The technical solutions in embodiments of this application may be applied to various wireless communication systems, for example, a long term evolution (LTE) system, a 5th generation (5G) mobile communication system, a new radio (NR) communication system, a next generation (NG) communication system, and a future mobile communication system.

Figure 1:
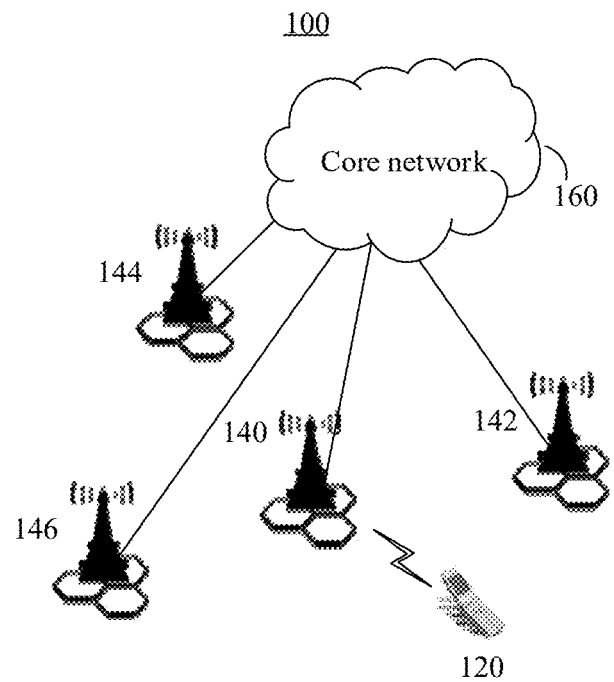
FIG. 1 is a schematic diagram of a wireless communication system according to an embodiment of this application.

In the wireless communication system, a terminal device is connected to a RAN device through a radio link, and communicates with another terminal device, accesses a wireless internet, or performs another operation through a CN device connected to the RAN device. Usually, one terminal device is wirelessly connected to one RAN device to implement communication. FIG. 1 is a schematic diagram of a wireless communication system 100 according to an embodiment of this application. A terminal device 120 establishes a wireless connection to a RAN device 140 through an air interface, and accesses a core network 160. In an actual system, to implement coverage of a radio network, a plurality of RAN devices are usually deployed in one area, and cells controlled by different RAN devices need to provide seamless coverage as much as possible. As shown in FIG. 1, a RAN device 142, a RAN device 144, and a RAN device 146 are deployed around the RAN device 140. There may be an interface for mutual communication between different RAN devices, for example, an X2 interface or an Xn interface. In a possible scenario, these RAN devices work in a same frequency band and are deployed at different geographical locations, and cells controlled by the RAN devices provide seamless coverage together. For example, there is an overlapping coverage area to some extent between a cell controlled by the RAN device 140 and a cell controlled by the RAN device 142. Generally, the overlapping coverage area cannot be excessively large or excessively small. During determining the size of the overlapping coverage area, balance between interference between intra-frequency cells and handover performance between cells needs to be considered. In another possible scenario, some RAN devices work in different frequency bands, forming heterogeneous network coverage. For example, a cell controlled by the RAN device 140 works in a low frequency band and has a large coverage area, and a cell controlled by the RAN device 142 works in a high frequency band and has a small coverage area. These RAN devices may be deployed at a same geographical location or different geographical locations, and the cells controlled by the RAN devices may have a complete overlapping coverage area. For example, the RAN device 140 works in a low frequency band, the RAN device 142 works in a high frequency band, and the coverage area of the cell controlled by the RAN device 140 can completely or mostly cover the coverage area of the cell controlled by the RAN device 142.

In an actual system, the RAN device shown in FIG. 1 may be a next-generation base station, for example, a next-generation NodeB (next-generation NodeB, gNB), a next-generation evolved NodeB (next-generation evolved NodeB, ng-eNB), an access point (access point, AP) in a wireless local area network (Wireless Local Area Networks, WLAN), an evolved base station (evolved NodeB, eNB or eNodeB) in LTE, a relay station or an access point, a vehicle-mounted device, a wearable device, or a transmission and reception point (transmission and reception point, TRP). It should be understood that the terminal device communicates with the RAN device by using a transmission resource (for example, a frequency domain resource, a time domain resource, or a code domain resource) used in one or more cells managed by the RAN device. The cell may be a macro cell (macro cell), a hyper cell (hyper cell), or a small cell (small cell). The small cell herein may include a metro cell (metro cell), a micro cell (micro cell), a pico cell (pico cell), a femto cell (femto cell), and the like. These small cells are characterized by small coverage and low transmit power, and are applicable to providing a high-rate data transmission service. The terminal device in FIG. 1 may also be referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device may be a station (station, ST) in a WLAN, a cellular phone, a cordless phone, a SIP phone, a wireless local loop (wireless local loop, WLL) station, a personal digital assistant (personal digital assistant, PDA) device, a handheld device with a wireless communication function, a relay device, a computing device or another processing device coupled to a wireless modem, a vehicle-mounted device, a wearable device, a terminal device in a next-generation communication system, for example, a terminal device in a 5G network or a terminal device in a future evolved public land mobile network (public land mobile network, PLMN), or the like. By way of example rather than limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn by a user or integrated into clothes or an accessory of a user. The wearable device is not only a hardware device, but also a device configured to implement a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

Figure 2:
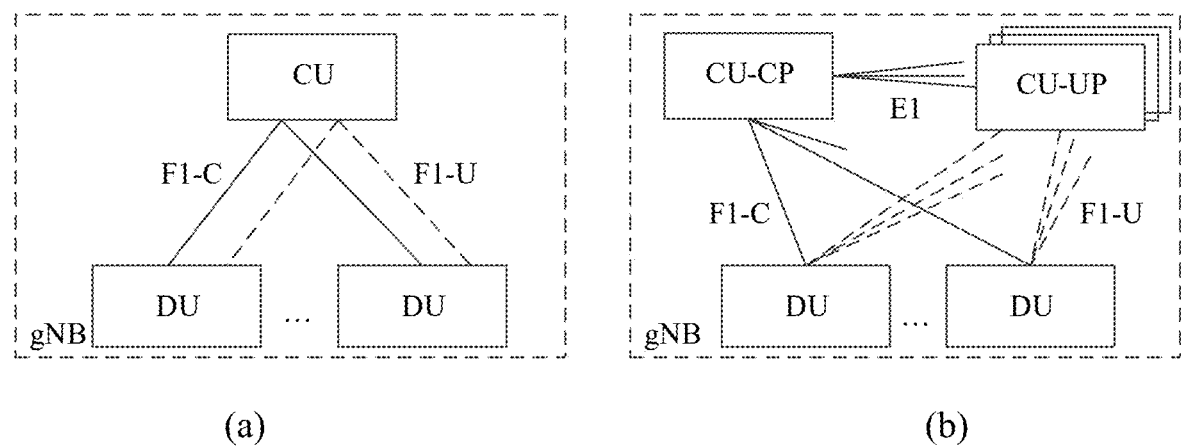
FIG. 2 is a schematic diagram of an architecture of a gNB divided into a CU and a DU according to an embodiment of this application.

Optionally, in a 5G system, a RAN device (for example, a gNB) may be further divided into a central unit (central unit, CU) and a distributed unit (distributed unit, DU) based on a protocol stack. The CU and the DU may be separately deployed on different physical devices. The CU is responsible for operations of an RRC layer, an SDAP layer, and a PDCP layer, and the DU is responsible for operations of an RLC layer, a MAC layer, and a PHY layer. (A) in FIG. 2 shows an architecture of a gNB divided into a CU and a DU. One gNB may include one CU and one or more DUs, and the one or more DUs are controlled by the CU. One DU is connected to the CU through a control plane interface (for example, F1-C), to transmit control plane data. One DU is connected to the CU through a user plane interface (for example, F1-U), to transmit user plane data. Further, the CU may be classified into a central unit-control plane (that is, a central unit-control plane CU-CP network element) and a central unit-user plane (that is, a central unit-user plane CU-UP network element). The CU-CP and the CU-UP may also be separately deployed on different physical devices, the CU-CP is responsible for control plane processing at the RRC layer and the PDCP layer, and the CU-UP is responsible for user plane processing at the SDAP layer and the PDCP layer. (B) in FIG. 2 shows an architecture of a gNB divided into a CU-CP, a CU-UP, and a DU. One gNB may include one CU-CP, one or more CU-UPs, and one or more DUs. One CP-UP is connected to only one CU-CP through a control plane interface (for example, E1), to transmit control plane data. One DU is connected to only one CU-CP through a control plane interface (for example, F1-C), to transmit control plane data. Under control of the CU-CP, one DU may be connected to one or more CU-UPs, one CU-UP may be connected to one or more DUs, and the CU-UP is connected to the DU through a user plane interface (for example, F1-U), to transmit user plane data. It should be noted that, to maintain network elasticity, one DU or one CU-UP may alternatively be connected to a plurality of CU-CPs. In this case, the plurality of CU-CPs serve as backups for each other. During actual application, only one CU-CP runs at a moment. It should be understood that, for an architecture of the RAN device divided into the CU and the DU, the foregoing protocol stack division manner in which the RAN device is divided into the CU and the DU is merely an example, and the RAN device may alternatively be divided into the CU and the DU in another division manner. For example, the CU may be responsible for operations of the RRC layer, the SDAP layer, the PDCP layer, and the RLC layer, and the DU is responsible for operations of the MAC layer and the PHY layer. Alternatively, the CU is responsible for operations of the RRC layer and the SDAP layer, and the DU is responsible for operations of the PDCP layer, the RLC layer, the MAC layer, and the PHY layer. Similarly, the protocol stack division manner in which the CU is divided into the CU-CP and the CU-UP is also changeable. This is not specifically limited in this application.

For ease of understanding, several concepts in embodiments of this application are first described. It should be understood that the following concept explanations may be limited due to a specific case in embodiments of this application, but it does not indicate that this application is limited to the specific case. The following concept explanations may also vary with specific cases in different embodiments.

Network slice: Different logical networks are customized based on different service requirements on a physical or virtual network infrastructure. The network slice may be a complete end-to-end network including a terminal device, a RAN, a transport network, a CN, and an application server, can provide a telecommunications service, and has a network capability. Alternatively, the network slice may be any combination of a terminal device, a RAN, a transport network, a CN, and an application server. Features of network slices may be different from the network functions that form the network slices.

Network slice identifier: In a network, a network slice needs to be identified by corresponding identification information. Currently, 3GPP SA2 defines single network slice selection assistance information (S-NSSAI) to identify one network slice. Each piece of S-NSSAI includes a slice/service type (SST) and a slice differentiator (SD). The SST is used to identify a service, and the SD is used to identify a tenant. NSSAI includes one or more pieces of S-NSSI. A network slice identifier of each network slice may be represented by using at least one of the following parameters.

1. Network slice type information: For example, the network slice type information may indicate a network slice type such as an enhanced mobile broadband (eMBB) service, ultra-reliable and low latency communication (URLLC), or massive machine type communication (mMTC), and optionally, the network slice type information may further indicate an end-to-end network slice type, including a RAN-to-CN network slice type, a RAN-side network slice type, or a CN-side network slice type.

2. Service type information: The service type information relates to a service, such as a video service, an Internet-of-Vehicles service, a voice service, and the like.

3. Tenant information: The tenant information is used to indicate information about a client who creates or rents the network slice, for example, Tencent or the State Grid.

4. User group information: The user group information is used to indicate group information for grouping users based on a feature, for example, a user level.

5. Slice group information: The slice group information is used to indicate that network slices may be grouped based on a feature, for example, all network slices that can be accessed by a terminal device may be used as a slice group, or network slices may be grouped based on another standard.

6. Network slice instance information: The network slice instance information is used to indicate an instance identifier and feature information that are created for the network slice, for example, an identifier may be allocated to a network slice instance to indicate the network slice instance, or a new identifier may be mapped based on an identifier of a network slice instance and associated with the network slice instance, and a receiver may identify, based on the identifier, the specific network slice instance indicated by the identifier.

7. Dedicated core network (DCN) identifier: The identifier is used to uniquely indicate a dedicated core network in an LTE system or an eLTE system, for example, a dedicated core network in the Internet of Things; optionally, mapping may be performed between the DCN identifier and the network slice identifier, and the network slice identifier may be obtained through mapping by using the DCN identifier, or the DCN identifier may be obtained through mapping by using the network slice identifier.

Allowed network slice: The allowed network slice may be referred to as allowed NSSAI, namely, NSSAI provided by a serving PLMN in a procedure such as a registration procedure, and may be used to indicate values of one or more pieces of S-NSSAI that can be used by a terminal device in a current registration area in the serving PLMN.

Requested network slice: The requested network slice may be referred to as requested NSSAI, namely, NSSAI provided by a terminal device for a serving PLMN in a registration procedure.

Figure 3:
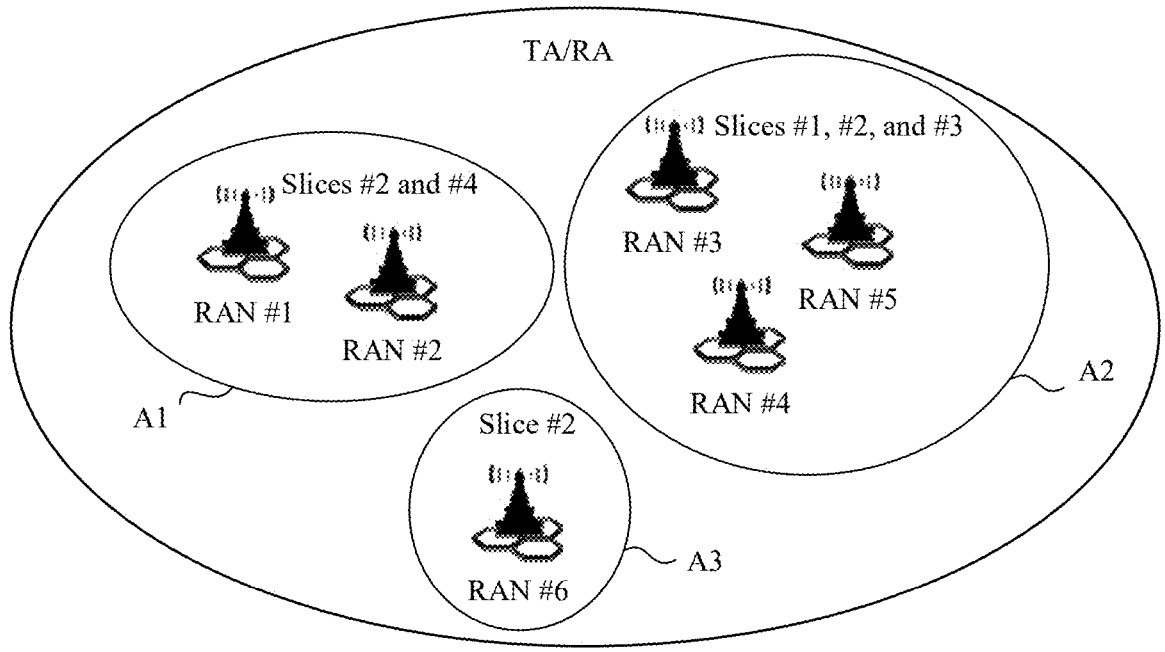
FIG. 3 is a schematic diagram of a status of support for a network slice by a RAN device according to an embodiment of this application.

In NR, when a terminal device is registered with a core network, an access and mobility management function (AMF) allocates a group of tracking areas (TAs) to the terminal device in a form of a tracking area identity (TAI) list. The group of tracking areas may also be referred to as registration areas (RAs). The group of TAs may include one or more TAs. If a network slice is deployed at a granularity of a TA or an RA, that is, RAN devices in a range of one TA or RA all support one or more same network slices, the terminal device may initiate, in the area, a service associated with any S-NSSAI included in allowed NSSAI, that is, may access any network slice in the allowed NSSAI. However, in an actual network, the network slice may be deployed at a granularity of a smaller range. As shown in FIG. 3, RAN devices RAN #1, RAN #2, RAN #3, RAN #4, RAN #5, and RAN #6 are deployed in a range of one TA or RA, and coverage areas of cells controlled by these RAN devices belong to a same TA or RA. If a network slice is deployed at a granularity of a TA or an RA, the cells controlled by the RAN #1 to the RAN #6 all support a same network slice, for example, a network slice #1 to a network slice #4. When registering with the TA or the RA, a terminal is allowed to access any one of the network slice #1 to the network slice #4 in a range of the TA or the RA. However, in an actual network, a network slice may be deployed at a smaller granularity. For example, one or more cells controlled by the RAN #1 and the RAN #2 form a coverage area A1 together, and the RAN #1 and the RAN #2 deploy the network slice #2 and the network slice #4; one or more cells controlled by the RAN #3 to the RAN #5 form a coverage area A2 together, and the RAN #3 to the RAN #5 deploy the network slice #1, the network slice #2, and the network slice #3; and one or more cells controlled by the RAN #6 form a coverage area A3 together, and the RAN #6 deploy the network slice #2. In other words, the area A1 supports the network slice #2 and the network slice #4, the area A2 supports the network slice #1 to the network slice #3, and the area A3 supports the network slice #2. It is limited in the existing 3GPP specification that when the terminal device registers with the core network, the allowed NSSAI provided by the AMF for the terminal device includes identifiers of the network slice #1 to the network slice #4. The inventor finds that the allowed NSSAI obtained by the terminal device in the registration procedure corresponds to that provided by the AMF for the entire TA or RA, but when the terminal device needs to initiate a network slice request in any cell in the TA or RA, a cell accessed by the terminal device may not support a network slice requested by the terminal device, and consequently the terminal device cannot access the network slice. In addition, when the terminal device initiates protocol data unit (PDU) session establishment in cells in different areas, network slice access efficiency is also different. For example, the terminal device can establish PDU sessions corresponding to the network slice #2 in all the areas A1, A2, and A3, but can establish a PDU session corresponding to the network slice #4 only in the area A1, and can establish PDU sessions corresponding to the network slice #1 and the network slice #3 only in the area A2. Therefore, embodiments of this application provide a technical solution for network slice redirection. Further, the technical solution in embodiments of this application is further applied to an architecture of a RAN device having a CU and a DU. The CU may further include a CU-CP and a CU-UP that are separated.

This specification provides the following several embodiments. The following describes in detail the technical solutions of this application with reference to FIG. 4 to FIG. 10 by using method embodiments. The following embodiments may be combined with each other, and a same or similar concept or process may not be described repeatedly in some embodiments. It should be noted that FIG. 4 to FIG. 11 are schematic flowcharts of method embodiments of this application, and show detailed communication steps or operations of the method. However, these steps or operations are merely examples. Other operations or variants of various operations in FIG. 4 to FIG. 11 may be alternatively performed in embodiments of this application. In addition, the steps in FIG. 4 to FIG. 11 may be performed in a sequence different from that presented in FIG. 4 to FIG. 11, and not all operations in FIG. 4 to FIG. 11 may be performed.

When accessing a 5G network from a radio resource control (radio resource control, RRC) idle state or an RRC inactive state, a terminal device first establishes or resumes an RRC connection to a cell, and the cell is a serving cell of the terminal device. The terminal device implements the RRC connection to the serving cell by exchanging RRC signaling with a RAN device (also referred to as a RAN device to which the cell belongs) that controls the cell. Then, the terminal device sends an initial non-access stratum (non-access stratum, NAS) message to a CN device. The initial NAS message may be a registration request (registration request) message, a PDU session establishment request (PDU session establishment request) message, or the like. The terminal device includes, in the registration request message or the PDU session establishment request message, an identifier of a network slice that the terminal device expects to access, that is, requested NSSAI.

In a possible implementation, network slice redirection is decided by the RAN device (also referred to as a serving RAN device) to which the serving cell connected to the terminal device belongs. In this implementation, the serving RAN device decides that the serving cell does not support some or all network slices requested by the terminal device, and performs network slice redirection decision-making. In this specification, the network slice requested by the terminal device is referred to as an original network slice.

Figure 4:
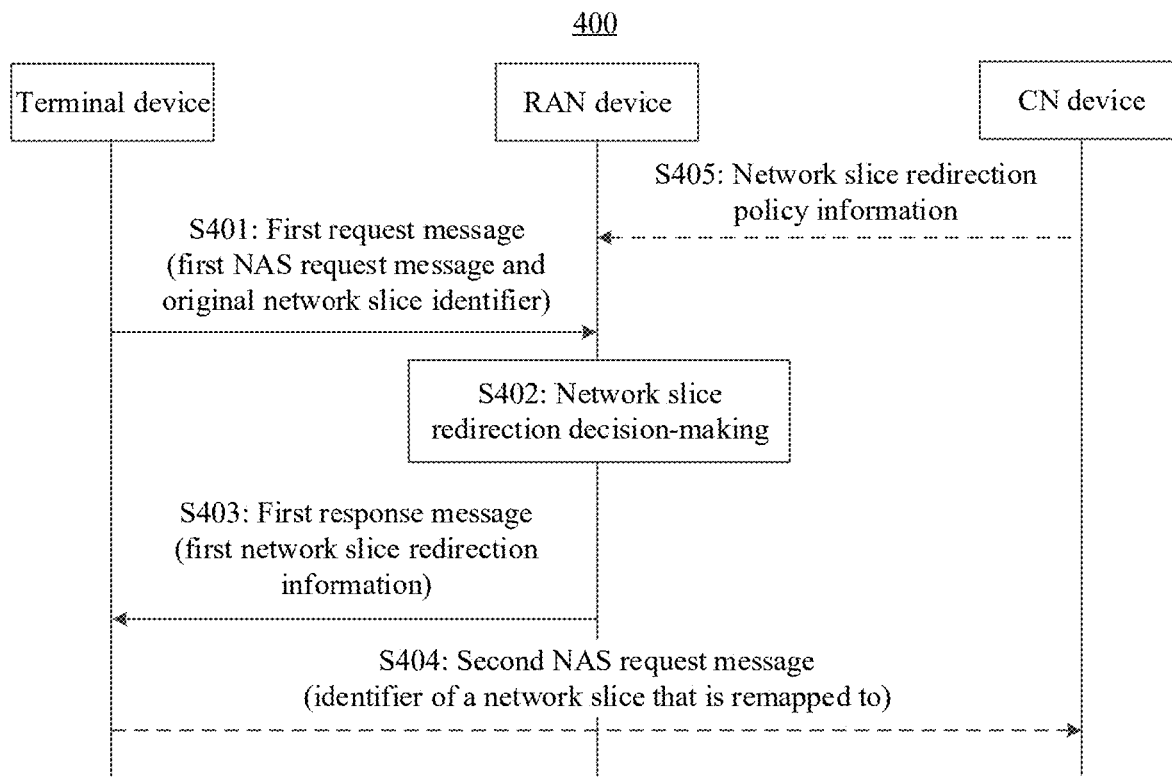
FIG. 4 is a schematic flowchart of a network slice redirection method according to an embodiment of this application.

FIG. 4 is a schematic flowchart of a network slice redirection method according to an embodiment of this application. The method 400 may be applied to interaction between a terminal device, a serving RAN device, and a CN device in a scenario in which the serving RAN device performs network slice redirection decision-making after receiving a request message sent by the terminal device, and notifies the terminal device of a decision result. A procedure in FIG. 4 includes the following steps.

S401: A terminal device sends a first request message to a RAN device. Correspondingly, the RAN device receives the first request message from the terminal device. The RAN device is a RAN device that controls a cell to which the terminal device establishes an RRC connection, namely, a serving RAN device.

The first request message includes a first NAS request message and a network slice identifier. The network slice identifier is an identifier that is of a network slice and that is included in the first NAS request message, and is also referred to as an identifier of an original network slice. The first NAS request message is a request message sent by the terminal device to a CN device by using the RAN device.

Optionally, the first NAS request message is used by the terminal device to request to establish a PDU session with a network or request to register with the network. Herein, the network slice identifier may be an identifier of one network slice, or may be identifiers of a plurality of network slices. Whether the network slice identifier is an identifier of one network slice or identifiers of a plurality of network slices depends on a quantity of network slices requested by the terminal device.

It should be noted that when the terminal device is in a home public land mobile network (home PLMN, HPLMN), the network slice identifier included in the first request message is a network slice identifier that belongs to the HPLMN; and when the terminal device is in a visited public land mobile network (visited PLMN, VPLMN), the network slice identifier included in the first request message is a network slice identifier that belongs to the VPLMN and a network slice identifier that belongs to the HPLMN, and there is a correspondence between the VPLMN network slice identifier and the HPLMN network slice identifier.

For example, the first NAS request message is a PDU session establishment request message. In this case, the first request message includes the PDU session establishment request message and the network slice identifier. The network slice identifier includes an identifier of one network slice, and is used to indicate a network slice corresponding to the PDU session that the terminal device requests to establish. The network slice is also referred to as an original network slice.

For example, the first NAS request message is a registration request message. In this case, the first request message includes the registration request message and the network slice identifier. The network slice identifier includes identifiers of one or more network slices, and is used to indicate one or more network slices that the terminal device requests to access, namely, requested NSSAI.

It should be noted that the first NAS request message includes a network slice identifier. For example, the PDU session establishment request message includes an identifier of one network slice corresponding to the PDU session, and the registration request message includes network slice identifiers of one or more network slices for which registration is requested. Because the RAN device does not parse a NAS message, the RAN device cannot identify the network slice identifier included in the first NAS request message. Therefore, an access stratum (access stratum, AS) message (namely, the first request message) sent by the terminal device to the RAN device needs to include a network slice identifier, so that the RAN device can read the corresponding network slice identifier.

S402: The RAN device performs network slice redirection decision-making.

In this step, the RAN device obtains the network slice identifier from the first request message. The RAN device identifies that the network slice indicated by the network slice identifier in the first request message does not match or partially matches a network slice supported by the serving cell, and performs the network slice redirection decision-making according to a network slice redirection policy.

The network slice redirection policy includes at least one of network slice remapping and terminal device redirection. Network slice remapping is to remap a network slice to one or more other network slices. For example, one service is originally run by using a resource of a first network slice, and network slice remapping is to enable the service to be run by using a resource of a second network slice, or resources of the second network slice and a third network slice. Herein, network slice remapping is to remap the first network slice to the second network slice, or the second network slice and the third network slice. Terminal device redirection is to release a connection between the terminal device and the serving cell, so that the terminal device can be connected to another cell. For example, terminal device redirection is to release the RRC connection between the terminal device and the serving cell, so that the terminal device can establish an RRC connection to another cell. Specifically, network slice remapping includes remapping an original network slice that is not supported by the serving cell indicated by the first request message to the network slice supported by the serving cell. Terminal device redirection includes redirecting, to another cell, the terminal device that initiates the first request message, where the another cell supports an original network slice. Network slice remapping and terminal device redirection include redirecting, to another cell, the terminal device that initiates the first request message, where the another cell does not fully support original network slices, but an original network slice not supported by the another cell may be remapped to a network slice supported by the cell. It should be noted that terminal device redirection may alternatively include redirecting the terminal device to another carrier, another carrier of another cell, another area, or the like.

For example, the serving cell of the terminal device supports a network slice #2 and a network slice #4, a first neighboring cell of the serving cell supports a network slice #1, the network slice #2, and a network slice #3, and a second neighboring cell of the serving cell supports the network slice #2. When the first request message sent by the terminal device to the serving RAN device includes an identifier of the network slice #1, the serving RAN device performs the network slice redirection decision-making. In a possible implementation, the serving RAN device decides to remap the network slice #1 requested by the terminal device to the network slice #2, and may further decide to remap the network slice #1 to the network slice #2 and the network slice #4. In another possible implementation, the serving RAN device redirects the terminal device to the first neighboring cell to support the terminal device in requesting the network slice #1. In still another possible implementation, the serving RAN device redirects the terminal device to the second neighboring cell, and remaps the network slice #1 to the network slice #2.

S403: The RAN device sends a first response message to the terminal device. Correspondingly, the terminal device receives the first response message from the RAN device. The first response message is a response message of the RAN device for the first request message.

The first response message includes first network slice redirection information. Specifically, the first network slice redirection information includes at least one of network slice remapping information and terminal device redirection information. The network slice remapping information includes identifiers of one or more network slices to which the original network slice is remapped, or includes a correspondence between an original network slice identifier and identifiers of one or more network slices to which the original network slice is remapped. The terminal device redirection information includes a cell identifier of another cell to which the terminal device is redirected. Terminal device redirection and network slice remapping information includes the cell identifier of the another cell to which the terminal device is redirected and the identifiers of the one or more network slices to which the original network slice is remapped, a correspondence between the cell identifier of the another cell to which the terminal device is redirected and the identifiers of the one or more network slices to which the original network slice is remapped, a priority corresponding to each of a plurality of network slices that are remapped to, timer information, timer information corresponding to each of the plurality of network slices that are remapped to, any combination of the foregoing information, or the like.

It should be noted that, in this specification, terminal device redirection may alternatively include redirecting the terminal device to another carrier, another carrier of another cell, another area, or the like. Therefore, the terminal device redirection information alternatively includes: information about a carrier to which the terminal device is redirected, that is, another carrier or carrier frequency to which the terminal device is redirected; information about a carrier to which the terminal device is redirected and a cell identifier; an identifier of an area to which the terminal device is redirected, where the area is a physical area in which the RAN device is located and whose range is less than that of a TA or an RA, and in the area, a plurality of cells controlled by a plurality of RAN devices support a same network slice; or a RAN network slice identifier, where the RAN network slice identifier may be a RAN slicing area (RAN slicing area, RSA) identifier or a RAN part identity (RAN part identity, RPI). For ease of description, the foregoing redirection manners are collectively referred to as redirecting a terminal device to another cell in this specification, and identifiers of objects to which a terminal device is redirected are collectively referred to as a cell identifier in this specification.

Optionally, when the RAN device decides to remap the original network slice to the network slice supported by the serving cell, the first response message is an RRC reconfiguration (RRC reconfiguration) message. When the RAN device decides to redirect, to another cell, the terminal device that initiates the first request message or redirect the terminal device to another cell and perform network slice remapping, the first response message is an RRC release (RRC release) message.

For example, when the first NAS request message is a PDU session establishment request message, the first response message is an RRC reconfiguration (RRC reconfiguration) message or an RRC release message. Optionally, if the network slice redirection decision-making is network slice remapping, the RRC reconfiguration message includes network slice remapping information, where the network slice remapping information includes an identifier of a network slice to which an original network slice is remapped; if the network slice redirection decision-making is terminal device redirection, the RRC release message includes terminal device redirection information, where the terminal device redirection information includes a cell identifier of another cell to which the terminal device is redirected; or if the network slice redirection decision-making is terminal device redirection and network slice remapping, the RRC release message includes terminal device redirection and network slice remapping information, where the terminal device redirection and network slice remapping information includes a cell identifier of another cell to which the terminal device is redirected and an identifier of another network slice that is supported by the another cell and to which an original network slice is remapped.

For example, when the first NAS request message is a registration request message, the first response message is an RRC reconfiguration (RRC reconfiguration) message or an RRC release message. Optionally, if the registration request message includes a plurality of network slice identifiers, and the serving cell supports some network slices, the RRC reconfiguration message includes identifiers that are of the network slices supported by the serving cell and that are in the registration request message, identifiers of network slices not supported by the serving cell, and identifiers of network slices that are supported by the serving cell and to which the unsupported network slices are remapped; the RRC reconfiguration message includes identifiers that are of network slices supported by the serving cell and that are in the registration request message; or the RRC reconfiguration message includes identifier of network slices not supported by the serving cell. If the serving cell supports none of a plurality of network slices indicated by the registration request message, the RRC reconfiguration message includes identifiers that are of the plurality of network slices and that are in the registration request message, and identifiers of network slices to which these network slices are remapped; the RRC reconfiguration message includes network slice identifiers of network slices that are remapped to; the RRC release message includes a cell identifier of another cell to which the terminal device is redirected; the RRC release message includes a cell identifier of another cell to which the terminal device is redirected and identifiers of network slices to which the plurality of network slices indicated by the registration request message are remapped; or the RRC release message includes a cell identifier of another cell to which the terminal device is redirected, identifiers of the plurality of network slices indicated by the registration request message, and an identifier of a network slice to which each network slice is remapped.

It should be noted that, when the first request message includes identifiers of a plurality of original network slices, if one original network slice is remapped to one new network slice, the first response message includes identifiers of a plurality of new network slices that are remapped to, and a sequence of the identifiers of the plurality of new network slices is the same as a sequence of the identifiers of the plurality of original network slices in the first request message; or if one original network slice is remapped to a plurality of new network slices, the first response message includes a plurality of sets of network slice identifiers, and one set of network slice identifiers includes an identifier of one original network slice and identifiers of a plurality of new network slices to which the original network slice is remapped.

The terminal device performs different operations based on different first network slice redirection information in the received first response message. For example, if the first network slice redirection information includes the network slice remapping information, the terminal device may initiate another NAS request in the serving cell. Another NAS request is used to request a network slice that is remapped to. The other NAS request message may include an original network slice identifier and an identifier of the network slice that is remapped to. If the first network slice redirection information includes that the terminal device is redirected to another cell, the terminal device releases a connection to the serving cell, connects to the other cell, and reinitiates the first NAS request in the other cell. It should be noted that because the other cell supports the original network slice indicated by the first NAS request, after the terminal device initiates the first NAS request in the other cell, operations performed by the terminal device and a network side device are similar to those in procedure steps in the existing 3GPP TS23.502 specification. Details are not described herein again in this application. If the first network slice redirection information includes the terminal device redirection and network slice remapping information, the terminal device releases a connection to the serving cell, connects to another cell, and initiates another NAS request in the other cell. The other NAS request is used to request a network slice that is remapped to. The other NAS request message may include an original network slice identifier and an identifier of the network slice that is remapped to. It should be noted that because network slice remapping needs to be performed in the other cell, after the terminal device initiates another NAS request in the other cell, operations performed by the terminal device and a network side device are similar to those in procedure steps in a case in which the RAN device decides to perform network slice remapping. Details are not described herein again in this application.

Optionally, when the first network slice redirection information includes the network slice remapping information, this embodiment further includes step S404.

S404: The terminal device sends a second NAS request message to the CN device.

Specifically, the terminal device sends the second NAS request to the CN device by using the RAN device. Correspondingly, the RAN device receives the second NAS request from the terminal device, and sends the second NAS request to the CN device. The CN device receives the second NAS request from the RAN device.

The second NAS request includes a second network slice identifier. Optionally, the second NAS request further includes a first network slice identifier. The first network slice identifier is an original network slice identifier, and the second network slice identifier is an identifier that is obtained by the terminal device from the first response message and that is of a network slice that is remapped to. It should be noted that the first network slice identifier and the second network slice identifier each may include identifiers of one or more network slices. When one network slice is remapped to a plurality of network slices, the second NAS request message may include a plurality of sets of network slice identifiers. One set of network slice identifiers includes an identifier of one original network slice and identifiers of a plurality of network slices to which the original network slice is remapped.

After receiving the second NAS request sent by the terminal device, the CN device further interacts with another device. Operations performed by the terminal device and a network side device are similar to those in procedure steps in the existing 3GPP TS23.502 specification. Details are not described herein again in this application. For example, after receiving a second PDU session establishment request message, an AMF further exchanges signaling with another device to complete PDU session establishment. After receiving a second registration request message, the AMF further exchanges signaling with another device to complete registration of the terminal device.

For example, the second NAS request message is a PDU session establishment request message or a registration request message.

It should be noted that before step S402, the RAN device has obtained the network slice redirection policy. The policy may be generated by the RAN device, or may be obtained by the RAN device from the CN device (for example, an AMF, a PCF, or an NSSF) or a network management system, or may be preconfigured for the RAN device, or may be stored in the RAN device. How the RAN device obtains the network slice redirection policy is not specifically limited in this application.

Optionally, some embodiments may further include step S405.

S405: The CN device sends network slice redirection policy information to the RAN device.

Correspondingly, the RAN device receives the network slice redirection policy information from the CN device.

The network slice redirection policy information includes a network slice redirection policy determined by the CN device, for example, includes an identifier of the first network slice and an identifier of the second network slice to which the first network slice is remapped; the identifier of the first network slice and a list of identifiers of a plurality of network slices to which the first network slice is remapped; the identifier of the first network slice and a cell identifier of another cell that supports the first network slice; the identifier of the first network slice and an identifier of another RAN device that supports the first network slice; the identifier of the first network slice, the identifier of the second network slice that is supported by another cell and to which the first network slice is remapped, and a cell identifier of the another cell; or any combination of the foregoing information. After receiving the network slice redirection policy information, the RAN device obtains the network slice redirection policy.

Optionally, the network slice redirection policy information may be exchanged in a procedure in which the RAN device and the CN device set up an NG interface or update an NG interface. For example, the network slice redirection policy information may be carried in an NG interface setup response (NG setup response) message, an AMF configuration update (AMF configuration update) message, or another NG interface message.

Optionally, a status of support for a network slice by cells controlled by different RAN devices may alternatively be exchanged in a procedure of setting up an Xn interface or updating an Xn interface between the RAN devices, for example, exchanged by using an Xn setup request/response (Xn setup request/response) message or an NG node configuration update/update acknowledgement (NG node configuration update/update acknowledgement) message. Through the exchange, different cells may learn of a cell identifier of another cell and an identifier of a network slice supported by the another cell.

When the RAN device has a CU-DU split architecture, in this embodiment, interaction between the terminal device and the RAN device is interaction, through a DU, between the terminal device and a CU connected to the DU, and interaction between the RAN device and the CN device is interaction between the CU and the CN device. When the CU is further divided into a CU-CP and a CU-UP, in this embodiment, interaction between the terminal device and the CU is interaction, through the DU, between the terminal device and the CU-CP of the CU connected to the DU, and interaction between the RAN device and the CN device is interaction between the CU-CP and the CN device.

In some embodiments, the CN device may be an AMF, an interface between the RAN device and the CN device may be an NG interface, an interface between the terminal device and the RAN device may be a Uu interface, an interface between the DU and the CU may be an F1 interface, an interface between the DU and the CU-CP may be an F1-C interface, and an interface between the CU/CU-CP and the CN device may be an NG interface.

According to the foregoing steps, after receiving the request of the terminal device, the RAN device performs the network slice redirection decision-making and notifies the terminal device, so that the terminal device may reinitiate the request based on the network slice redirection information. This improves network slice access efficiency. In addition, because signaling is exchanged only between the terminal device and the RAN device, signaling overheads are reduced, and access delay is shortened.

Figure 5:
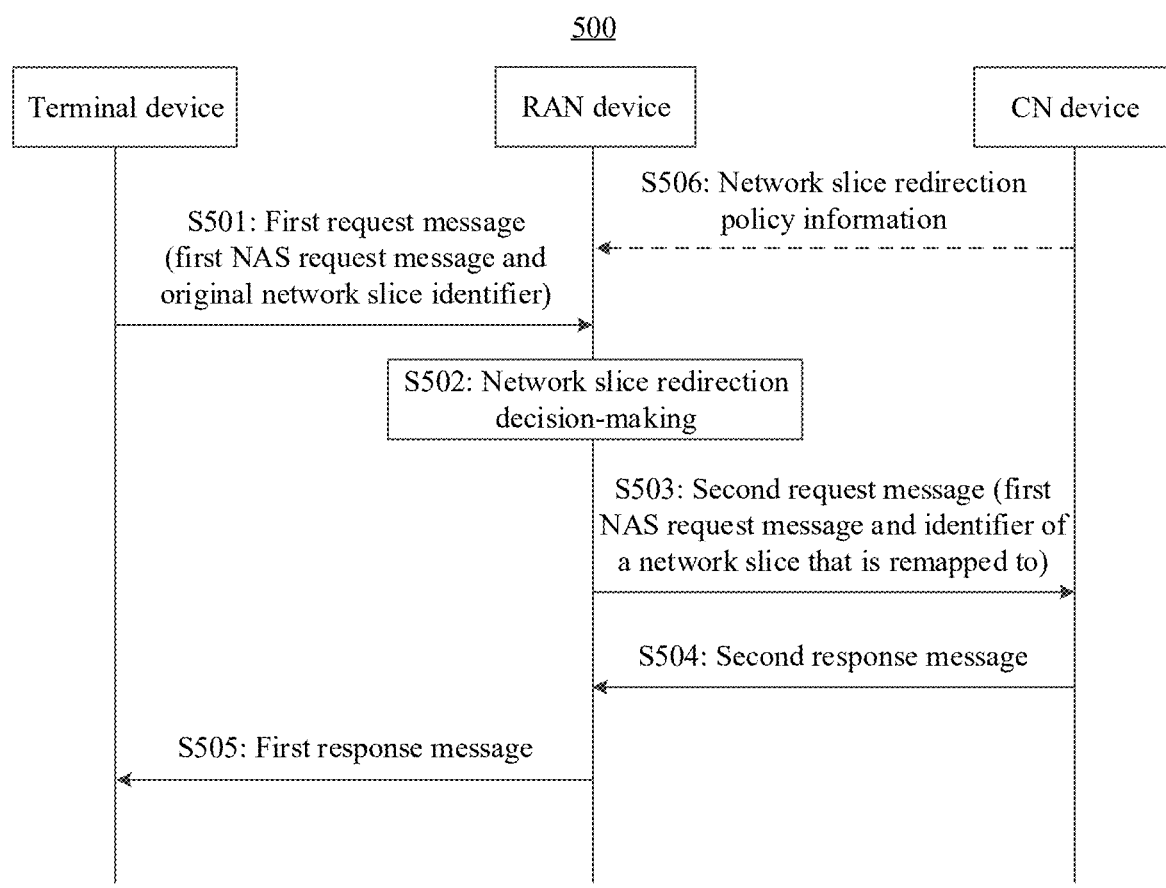
FIG. 5 is a schematic flowchart of another network slice redirection method according to an embodiment of this application.

FIG. 5 is a schematic flowchart of another network slice redirection method according to an embodiment of this application. The method 500 may be applied to interaction between a terminal device, a serving RAN device, and a CN device in a scenario in which the serving RAN device performs network slice redirection decision-making after receiving a request message sent by the terminal device, and notifies the CN device of a decision result when the serving RAN device decides to perform network slice remapping. A procedure in FIG. 5 includes the following steps.

S501: A terminal device sends a first request message to a RAN device.

S502: The RAN device performs network slice redirection decision-making.

Steps S501 and S502 are respectively similar to steps S401 and S402 in the foregoing embodiments. Details are not described herein again in this application. A difference between step S502 and step S402 is as follows: In step S502, the network slice redirection decision-making performed by the RAN device is network slice remapping, that is, the RAN device decides to remap some or all original network slices to network slices supported by a serving cell.

S503: The RAN device sends a second request message to a CN device. Correspondingly, the CN device receives the second request message from the RAN device.

The second request message includes a first NAS request message and an identifier of a network slice that is remapped to. For example, when the RAN device decides, in step S502, to remap a network slice #1 indicated by the first NAS request message to a network slice #2, the second request message includes the first NAS request message and an identifier of the network slice #2. It should be noted that the first NAS request message includes an identifier of a network slice requested by the terminal device, and the RAN device includes the identifier of the network slice that is remapped to in the second request message. In this way, the CN device may learn of the original network slice requested by the terminal device and the network slice that is remapped to. It should be noted that, when the first NAS request message includes identifiers of a plurality of original network slices, if one original network slice is remapped to one new network slice, the second request message includes identifiers of a plurality of new network slices that are remapped to, and a sequence of the identifiers of the plurality of new network slices is the same as a sequence of the identifiers of the plurality of original network slices in the first NAS request message; or if one original network slice is remapped to a plurality of new network slices, the second request message includes a plurality of sets of network slice identifiers, and one set of network slice identifiers includes an identifier of one original network slice and identifiers of a plurality of new network slices to which the original network slice is remapped.

S504: The CN device sends a second response message to the RAN device. Correspondingly, the RAN device receives the second response message from the CN device. The second response message is a response message of the CN device for the second request message.

The second response message includes a first NAS response message used to respond to the first NAS request message in the second request message. Optionally, the second response message further includes an acknowledgement indication, used to acknowledge acceptance of a network slice remapping decision result of the RAN device. Optionally, the first NAS response message includes the identifier of the network slice that is remapped to.

Optionally, the first NAS response message may be a PDU session establishment accept (PDU session establishment accept) message or a registration accept (registration accept) message.

S505: The RAN device sends a first response message to the terminal device.

Step S505 is similar to step S403 in the foregoing embodiments. Details are not described herein again in this application. It should be noted that a difference between step S505 and step S403 is as follows: Network slice redirection information included in the first response message in step S505 is network slice remapping information. In addition, the first response message may further include the first NAS response message. The first NAS response message may include the network slice redirection information.

Similar to the foregoing embodiment, before step S502, the RAN device has obtained a network slice redirection policy. Optionally, this embodiment further includes step S506.

S506: The CN device sends network slice redirection policy information to the RAN device.

Step S506 is similar to step S405 in the foregoing embodiment. Details are not described herein again.

When the RAN device has a CU-DU split architecture, in this embodiment, interaction between the terminal device and the RAN device is interaction, through a DU, between the terminal device and a CU connected to the DU, and interaction between the RAN device and the CN device is interaction between the CU and the CN device. When the CU is further divided into a CU-CP and a CU-UP, in this embodiment, interaction between the terminal device and the CU is interaction, through the DU, between the terminal device and the CU-CP of the CU connected to the DU, and interaction between the RAN device and the CN device is interaction between the CU-CP and the CN device.

In this embodiment, the CN device may be an AMF, an interface between the RAN device and the CN device may be an NG interface, an interface between the terminal device and the RAN device may be a Uu interface, an interface between the DU and the CU may be an F1 interface, an interface between the DU and the CU-CP may be an F1-C interface, and an interface between the CU/CU-CP and the CN device may be an NG interface.

According to the foregoing steps in this embodiment, after receiving the request of the terminal device, the RAN device performs network slice remapping decision-making and notifies the CN device, so that an appropriate resource can be quickly allocated between the RAN device and the CN device to accept the request of the terminal device.

Figure 6:
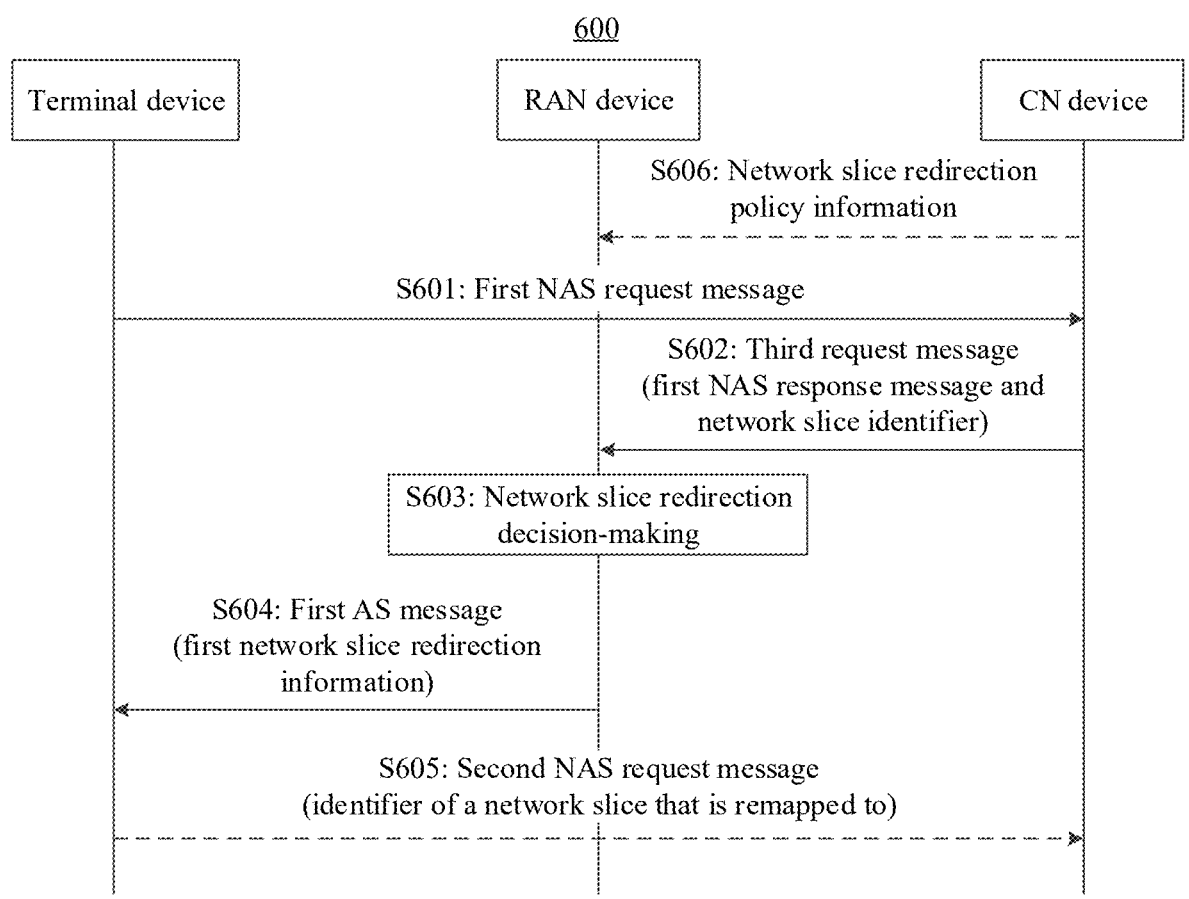
FIG. 6 is a schematic flowchart of still another network slice redirection method according to an embodiment of this application.

FIG. 6 is a schematic flowchart of still another network slice redirection method according to an embodiment of this application. The method 600 may be applied to interaction between a terminal device, a serving RAN device, and a CN device in a scenario in which the RAN device performs network slice redirection decision-making after receiving a request message sent by the CN device, and notifies the terminal device of a decision result. A procedure in FIG. 6 includes the following steps.

S601: A terminal device sends a first NAS request message to a CN device.

The first NAS request message in step S601 is the same as the first NAS request message in step S401. Details are not described herein again in this application.

S602: The CN device sends a third request message to a RAN device. Correspondingly, the RAN device receives the third request message from the CN device.

The third request message includes a first NAS response message and a network slice identifier. The first NAS response message is a response message of the CN device for the first NAS request message sent by the terminal device. The first NAS response message is a NAS stratum message sent by the CN device to the terminal device by using the RAN device. It should be noted that the first NAS response message includes an original network slice identifier. Because the RAN device does not parse a NAS message, the RAN device cannot identify the original network slice identifier included in the first NAS response message. Therefore, an interface message (namely, the third request message) sent by the CN device to the RAN device needs to include a network slice identifier, so that the RAN device can read the corresponding network slice identifier.

For example, when the first NAS request message is a PDU session establishment request message, the third request message is a PDU session request (PDU session request) message or a PDU session resource setup request (PDU session resource setup request) message. Optionally, the first NAS response message is a PDU session establishment accept (PDU session establishment accept) message. In addition to the first NAS response message, the network slice identifier included in the third request message is a network slice identifier associated with a PDU session, namely, an original network slice identifier.

For example, when the first NAS request message is a registration request message, the third request message is an initial context setup request (initial context setup request) message, and the first NAS response message is a registration accept (registration accept) message. Optionally, the first NAS response message includes allowed NSSAI. In addition to the first NAS response message, the network slice identifier included in the third request message is allowed NSSAI. Optionally, the CN device determines a corresponding RAT/frequency selection priority (RAT/Frequency Selection Priority, RFSP) based on a network slice identifier (requested NSSAI) requested by the terminal device, and sends an index corresponding to the RFSP to the RAN device. For example, for a registration procedure, it is assumed that an AMF performs redirection decision-making. For example, UE requests a network slice #2, but a current base station supports a network slice #1. It is assumed that the network slice #1 is on a carrier frequency #1, and the network slice #2 is on a carrier frequency #2. In this case, allowed NSSAI provided by the AMF is the network slice #1. According to a current 3GPP standard, an RFSP index included by the AMF in an NG interface message can only be an RFSP index corresponding to the network slice #1. In a possible implementation, the AMF may determine the RFSP index based on the requested NSSAI and a subscribed RFSP index, a locally configured operator policy, or a context of the terminal device, and send the RFSP index to the RAN device by using an NGAP interface message (for example, a downlink NAS transport (downlink NAS transport) message), and may further send the requested NSSAI to the RAN device. In another possible implementation, the AMF determines, based on both the allowed NSSAI and the requested NSSAI, an RFSP index corresponding to a network slice, and sends S-NSSAI and the corresponding RFSP index to the RAN device by using the NG interface message, and may further send the requested NSSAI to the RAN device. To be specific, the AMF may send each piece of S-NSSAI in the allowed NSSAI and the requested NSSAI, and a corresponding RFSP index to the RAN device. In other words, the allowed NSSAI, an RFSP index corresponding to the allowed NSSAI, and an RFSP index corresponding to the requested NSSAI are sent to the RAN device.

S603: The RAN device performs network slice redirection decision-making.

In this step, the RAN device obtains the network slice identifier from the third request message. The RAN device identifies that a network slice indicated by the network slice identifier does not match or partially matches a network slice supported by a serving cell, and performs the network slice redirection decision-making according to a network slice redirection policy. This step is similar to step S402 in the foregoing embodiment. Details are not described herein again in this application.

For example, the RAN device finds, based on an RFSP corresponding to an RFSP index provided by a core network, that a current frequency of the RAN device is not a high-priority frequency in the RFSP. The RAN device decides to redirect the terminal device to the high-priority frequency. For example, for the registration procedure, one possibility is that the base station determines, based on an RFSP index provided by the AMF, that a frequency included in the RFSP cannot be supported, and therefore decides to redirect the UE. The RAN device includes carrier frequency information in network slice redirection information included in an RRC release message. The carrier frequency is a carrier frequency corresponding to the RSFP index provided by the CN device.

S604: The RAN device sends a first AS message to the terminal device.

S605: The terminal device sends a second NAS request message to the CN device.

Steps S604 and S605 are respectively similar to steps S403 and S404 in the foregoing embodiment. Content of the first AS message in step S604 is similar to content of the first response message in step S403. Details are not described herein again in this application. Further, the first AS message may include the first NAS response message.

Similar to the foregoing embodiment, before step S601, the RAN device has obtained the network slice redirection policy. Optionally, some embodiments further includes step S606.

S606: The CN device sends network slice redirection policy information to the RAN device.

Step S606 is similar to step S405 in the foregoing embodiment. Details are not described herein again.

When the RAN device has a CU-DU split architecture, in this embodiment, interaction between the terminal device and the RAN device is interaction, through a DU, between the terminal device and a CU connected to the DU, and interaction between the RAN device and the CN device is interaction between the CU and the CN device. When the CU is further divided into a CU-CP and a CU-UP, in this embodiment, interaction between the terminal device and the CU is interaction, through the DU, between the terminal device and the CU-CP of the CU connected to the DU, and interaction between the RAN device and the CN device is interaction between the CU-CP and the CN device.

In this embodiment, the CN device may be an AMF, an interface between the RAN device and the CN device may be an NG interface, an interface between the terminal device and the RAN device may be a Uu interface, an interface between the DU and the CU may be an F1 interface, an interface between the DU and the CU-CP may be an F1-C interface, and an interface between the CU/CU-CP and the CN device may be an NG interface.

According to the foregoing steps in this embodiment, after receiving the request message forwarded by the CN device, the RAN device performs the network slice redirection decision-making and notifies the terminal device, so that the terminal device may reinitiate the request based on the network slice redirection information. This improves network slice access efficiency. In addition, because the terminal device does not need to send an AS stratum request message to the RAN device, backward compatibility for the terminal device is enhanced.

Figure 7:
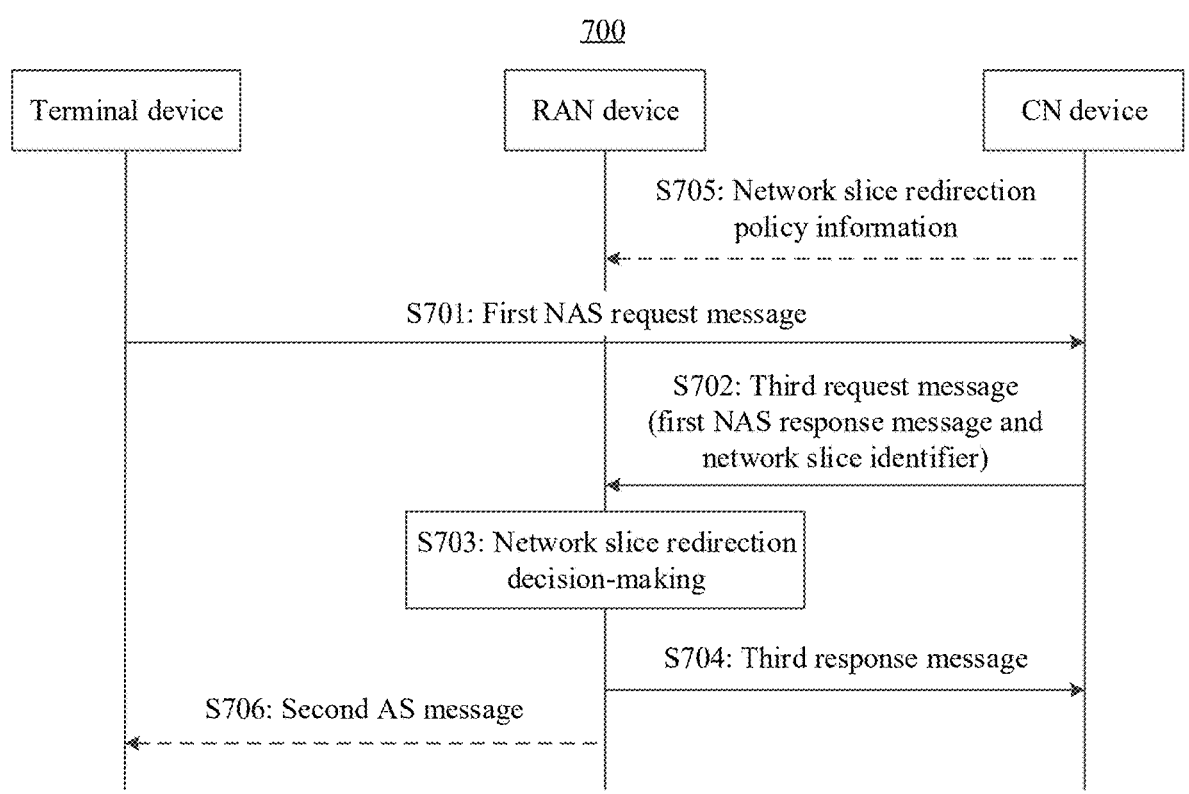
FIG. 7 is a schematic flowchart of yet another network slice redirection method according to an embodiment of this application.

FIG. 7 is a schematic flowchart of yet another network slice redirection method according to an embodiment of this application. The method 700 may be applied to interaction between a terminal device, a serving RAN device, and a CN device in a scenario in which the serving RAN device performs network slice redirection decision-making after receiving a request message sent by the CN device, and notifies the CN device of a decision result when the serving RAN device decides to perform network slice remapping. A procedure in FIG. 7 includes the following steps.

S701: A terminal device sends a first NAS request message to a CN device.

S702: The CN device sends a third request message to a RAN device.

S703: The RAN device performs network slice redirection decision-making.

Steps S701 to S703 are respectively similar to steps S601 to S603 in the foregoing embodiment. Details are not described herein again in this application.

S704: The RAN device sends a third response message to the CN device. Correspondingly, the CN device receives the third response message from the RAN device. The third response message is a response message of the RAN device for the third request message.

The third response message includes network slice redirection information. Specifically, the network slice redirection information includes network slice remapping information. The network slice remapping information includes an identifier of a network slice to which an original network slice is remapped, or a correspondence between a network slice identifier in the third request message and an identifier of a network slice that is remapped to.

For example, when the third request message is a PDU session request message or a PDU session resource setup request message, the third response message is a PDU session response message or a PDU session resource setup response message.

For example, when the third request message is an initial context setup request message, the third response message is an initial context setup response (initial context setup response) message.

It should be noted that, when the third request message includes identifiers of a plurality of original network slices, if one original network slice is remapped to one new network slice, the third response message includes identifiers of a plurality of new network slices that are remapped to, and a sequence of the identifiers of the plurality of new network slices is the same as a sequence of the identifiers of the plurality of original network slices in the third request message; or if one original network slice is remapped to a plurality of new network slices, the third response message includes a plurality of sets of network slice identifiers, and one set of network slice identifiers includes an identifier of one original network slice and identifiers of a plurality of new network slices to which the original network slice is remapped.

Similar to the foregoing embodiment, before step S701, the RAN device has obtained a network slice redirection policy. Optionally, some embodiments further includes step S705.

S705: The CN device sends network slice redirection policy information to the RAN device.

Step S705 is similar to step S405 in the foregoing embodiment. Details are not described herein again.

Optionally, this embodiment further includes step S706.

S706: The RAN device sends a second AS message to the terminal device. Correspondingly, the terminal device receives the second AS message from the RAN device. The second AS message is used for forwarding a first NAS response message from the CN device. The first NAS response message may include the network slice redirection information. Optionally, the second AS message is used by the RAN device to send the network slice redirection information to the terminal device.

When the RAN device has a CU-DU split architecture, in some embodiments, interaction between the terminal device and the RAN device is interaction, through a DU, between the terminal device and a CU connected to the DU, and interaction between the RAN device and the CN device is interaction between the CU and the CN device. When the CU is further divided into a CU-CP and a CU-UP, in some embodiments, interaction between the terminal device and the CU is interaction, through the DU, between the terminal device and the CU-CP of the CU connected to the DU, and interaction between the RAN device and the CN device is interaction between the CU-CP and the CN device.

In embodiments, the CN device may be an AMF, an interface between the RAN device and the CN device may be an NG interface, an interface between the terminal device and the RAN device may be a Uu interface, an interface between the DU and the CU may be an F1 interface, an interface between the DU and the CU-CP may be an F1-C interface, and an interface between the CU/CU-CP and the CN device may be an NG interface.

According to the foregoing steps, after receiving a request message forwarded by the CN device, the RAN device performs network slice remapping decision-making and notifies the CN device, so that an appropriate resource can be quickly allocated between the RAN device and the CN device to accept the request of the terminal device. In addition, because the terminal device does not need to send an AS stratum request message to the RAN device, backward compatibility for the terminal device is enhanced.

Figure 8:
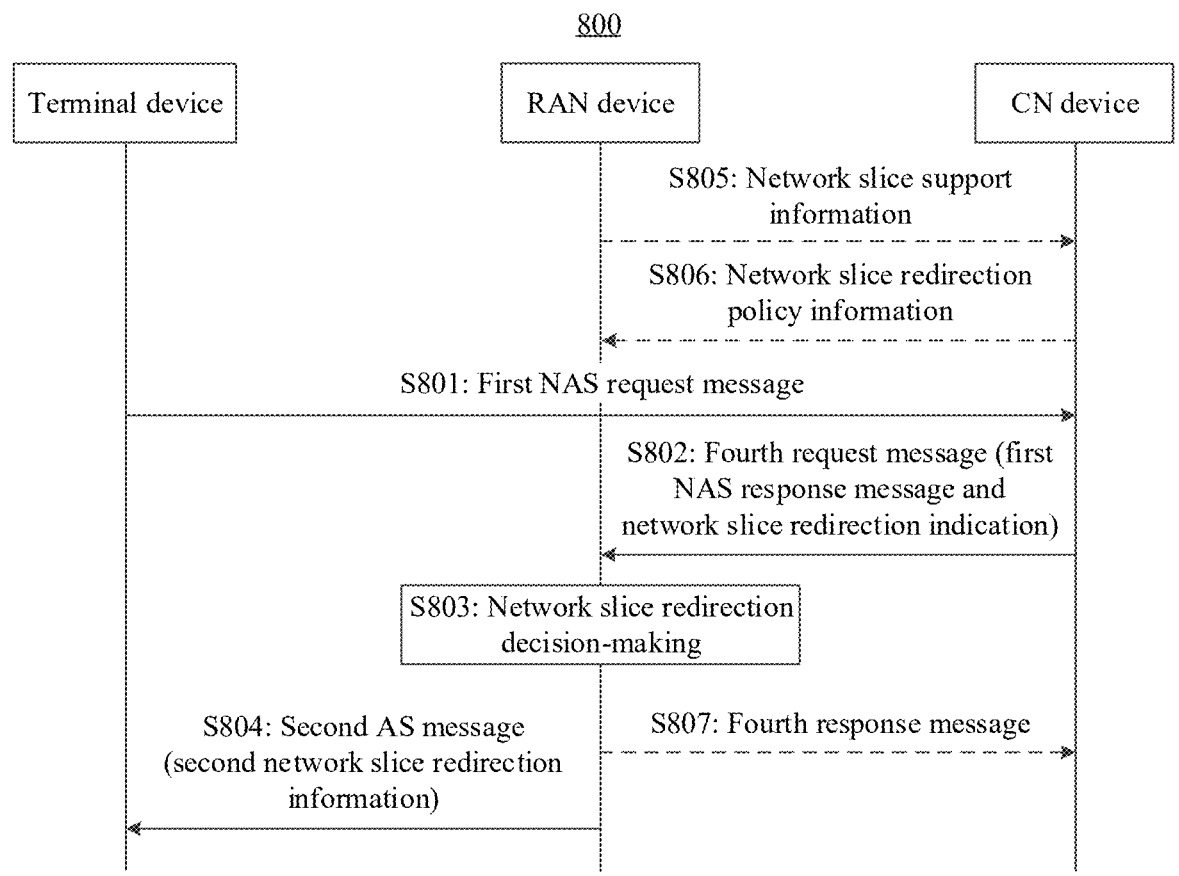
FIG. 8 is a schematic flowchart of yet another network slice redirection method according to an embodiment of this application.

FIG. 8 is a schematic flowchart of yet another network slice redirection method according to an embodiment of this application. The method 800 may be applied to interaction between a terminal device, a serving RAN device, and a CN device in a scenario in which the RAN device performs network slice redirection decision-making after receiving a request message that includes a network slice redirection indication and that is sent by the CN device, and notifies the terminal device of a decision result when the RAN device decides to redirect the terminal device. A procedure in FIG. 8 includes the following steps.

S801: A terminal device sends a first NAS request message to a CN device.

Step S801 is similar to step S601 in the foregoing embodiment. Details are not described herein again in this application.

S802: The CN device sends a fourth request message to a RAN device. Correspondingly, the RAN device receives the fourth request message from the CN device.

The fourth request message includes a first NAS response message and a network slice redirection indication. Optionally, the fourth request message further includes an original network slice identifier. The network slice redirection indication is used to indicate to redirect the terminal device to another cell, or indicate to redirect the terminal device to another cell and perform network slice remapping.

The CN device obtains, from the first NAS request message, a network slice identifier requested by the terminal device. The CN device determines, based on a status that is of support for a network slice by the RAN device and that is obtained by the CN device, that a serving cell does not support an original network slice, and the original network slice is not suitable to be remapped to another network slice of the serving cell, or another neighboring cell of a serving cell supports an original network slice, or an original network slice may be remapped to a network slice of another neighboring cell. The first NAS response message and the network slice redirection indication are sent to the RAN device in the fourth request message, so that the RAN device can perform network slice redirection decision-making.

S803: The RAN device performs the network slice redirection decision-making.

Step S803 is similar to step S402 in the foregoing embodiments. A difference is as follows: In this embodiment, the network slice redirection indication obtained by the RAN device from the CN device indicates terminal device redirection or terminal device redirection and network slice remapping. The RAN device decides a cell to which the terminal device is redirected, or decides a cell to which the terminal device is redirected and a network slice (or network slices) to which the original network slice is remapped.

S804: The RAN device sends a second AS message to the terminal device.

Correspondingly, the terminal device receives the second AS message from the RAN device.

The second AS message includes second network slice redirection information. Specifically, the second network slice redirection information includes terminal device redirection information, or terminal device redirection and network slice remapping information. The terminal device redirection information includes a cell identifier of another cell to which the terminal device is redirected. The terminal device redirection and network slice remapping information includes a cell identifier of another cell to which the terminal device is redirected and an identifier of a network slice to which the original network slice is remapped, a cell identifier of another cell to which the terminal device is redirected and a correspondence between the network slice identifier included in the first NAS request message and the identifier of a network slice that is remapped to, or any combination of the foregoing information.

Optionally, the second AS message is an RRC release (RRC release) message.

For example, when the first NAS request message is a PDU session establishment request message, the second AS message is the RRC release message. In this case, the RRC release message includes the cell identifier of the another cell to which the terminal device is redirected. Further, the RRC release message further includes identifiers of one or more network slices that are supported by the another cell and to which the original network slice is remapped.

For example, when the first NAS request message is a registration request message, the second AS message is the RRC release message. In this case, if the serving cell supports none of a plurality of network slices indicated by the registration request message, the RRC release message includes a cell identifier of another cell to which the terminal device is redirected; the RRC release message includes a cell identifier of another cell to which the terminal device is redirected and identifiers of network slices to which the plurality of network slices indicated by the registration request message are remapped; or the second AS message includes a cell identifier of another cell to which the terminal device is redirected, identifiers that are of the plurality of network slices and that are included in the registration request message, and identifiers of one or more network slices to which each network slice is remapped.

It should be noted that, when the fourth request message includes identifiers of a plurality of original network slices, if one original network slice is remapped to one new network slice, the second AS message includes identifiers of a plurality of new network slices that are remapped to, and a sequence of the identifiers of the plurality of new network slices is the same as a sequence of the identifiers of the plurality of original network slices in the fourth request message; or if one original network slice is remapped to a plurality of new network slices, the second AS message includes a plurality of sets of network slice identifiers, and one set of network slice identifiers includes an identifier of one original network slice and identifiers of a plurality of new network slices to which the original network slice is remapped.

After the terminal device receives the second AS message, the terminal device releases a connection to the serving cell, connects to another cell, and reinitiates a NAS request in the other cell. It should be noted that, if the network slice redirection information includes the terminal device redirection information, because the other cell supports the network slice indicated by the first NAS request, the terminal device initiates the first NAS request in the other cell. In this case, operations performed by the terminal device and a network side device are similar to those in procedure steps in an existing standard. Details are not described herein again in this application. If the network slice redirection information includes the terminal device and network slice remapping information, the terminal device releases a connection to the serving cell, connects to the other cell, and initiates another NAS request in the other cell. The other NAS request is used to request a network slice that is remapped to. The other NAS request message may include an original network slice identifier and an identifier of the network slice that is remapped to. It should be noted that, because network slice remapping needs to be performed in the other cell, the terminal device initiates the other NAS request in the other cell. In this case, operations performed by the terminal device and a network side device are similar to those in the procedure steps in this embodiment. Details are not described herein again in this application.

It should be noted that, before step S802, the CN device has obtained a status of support for a network slice by the RAN device, for example, a specific network slice supported by each cell controlled by the RAN device. The network slice status of the network slice supported by the RAN device may be obtained by the CN device from the RAN device, or may be preconfigured for the CN device, or may be stored in the CN device. How the RAN device obtains a network slice redirection policy is not specifically limited in this application.

Optionally, some embodiments may further include step S805.

S805: The RAN device sends network slice support information to the CN device.

Correspondingly, the CN device receives the network slice support information from the RAN device.

The network slice support information may include an identifier of a network slice supported by each of one or more cells controlled by the RAN device.

Optionally, the network slice support information may be exchanged in a procedure in which the RAN device and the CN device set up an NG interface or update an NG interface. For example, the network slice support information may be carried in an NG setup request (NG setup request) message or a RAN configuration update (RAN configuration update) message.

In addition, before step S803, the RAN device has obtained the network slice redirection policy. Optionally, some embodiments may further include step S806.

S806: The CN device sends network slice redirection policy information to the RAN device.

Step S806 is similar to step S405 in the foregoing embodiment. Details are not described herein again in this application.

Optionally, this embodiment further includes step S807.

S807: The RAN device sends a fourth response message to the CN device. Correspondingly, the CN device receives the fourth response message from the RAN device. The fourth response message is a response message of the RAN device for the fourth request message.

The fourth response message is used to indicate the network slice redirection information.

When the RAN device has a CU-DU split architecture, in this embodiment, interaction between the terminal device and the RAN device is interaction, through a DU, between the terminal device and a CU connected to the DU, and interaction between the RAN device and the CN device is interaction between the CU and the CN device. When the CU is further divided into a CU-CP and a CU-UP, in this embodiment, interaction between the terminal device and the CU is interaction, through the DU, between the terminal device and the CU-CP of the CU connected to the DU, and interaction between the RAN device and the CN device is interaction between the CU-CP and the CN device.

In this embodiment, the CN device may be an AMF, an interface between the RAN device and the CN device may be an NG interface, an interface between the terminal device and the RAN device may be a Uu interface, an interface between the DU and the CU may be an F1 interface, an interface between the DU and the CU-CP may be an F1-C interface, and an interface between the CU/CU-CP and the CN device may be an NG interface.

According to the foregoing steps in this embodiment, when the CN device indicates that network slice redirection needs to be performed, after receiving a request message forwarded by the CN device, the RAN device performs the network slice redirection decision-making and notifies the terminal device, so that the terminal device may reinitiate the request based on the network slice redirection information. This improves network slice access efficiency. In addition, the CN device first determines whether network slice redirection needs to be performed. This reduces possible signaling overheads. Further, because the terminal device does not need to send an AS stratum request message to the RAN device, backward compatibility for the terminal device is enhanced.

Figure 9:
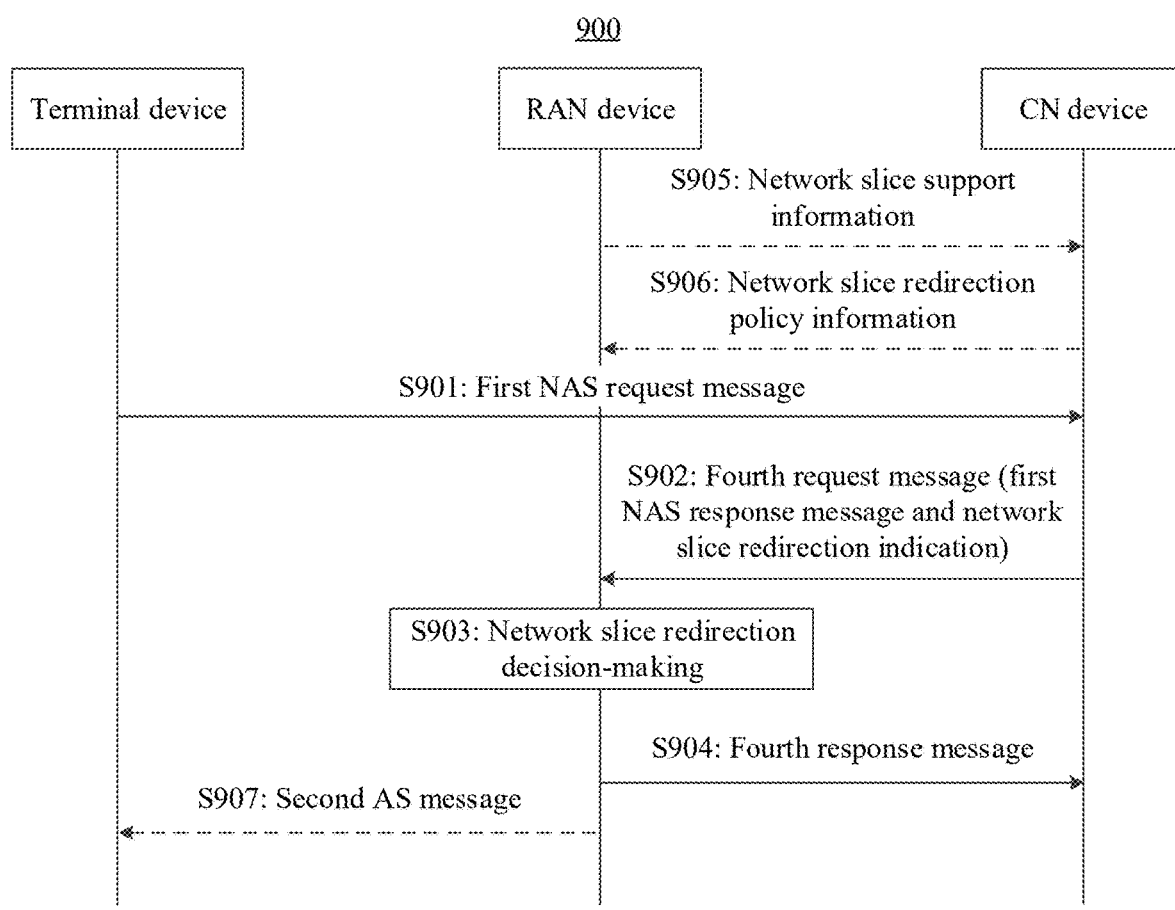
FIG. 9 is a schematic flowchart of yet another network slice redirection method according to an embodiment of this application.

FIG. 9 is a schematic flowchart of yet another network slice redirection method according to an embodiment of this application. The method 900 may be applied to interaction between a terminal device, a RAN device that controls a serving cell, and a CN device in a scenario in which the RAN device performs network slice redirection decision-making after receiving a request message that includes a network slice redirection indication and that is sent by the CN device, and notifies the CN device of a decision result when the RAN device decides to perform network slice remapping. A procedure in FIG. 9 includes the following steps.

S901: A terminal device sends a first NAS request message to a CN device.

S902: The CN device sends a fourth request message to a RAN device.

Steps S901 and S902 are respectively similar to steps S801 and S802 in the foregoing embodiments. Details are not described herein again in this application. A difference between step S902 and step S802 is as follows: In step S902, a network slice redirection indication included in the fourth request message is used to indicate to remap an original network slice to another network slice of a serving cell.

S903: The RAN device performs network slice redirection decision-making.

Step S903 is similar to step S402 in the foregoing embodiments. A [main] difference is as follows: In this embodiment, the network slice redirection indication obtained by the RAN device from the CN device indicates network slice remapping. The RAN device decides a network slice (or network slices) supported by the serving cell and to which the original network slice is remapped.

S904: The RAN device sends a fourth response message to the CN device. Correspondingly, the CN device receives the fourth response message from the RAN device. The fourth response message is a response message of the RAN device for the fourth request message.

The fourth response message in this step is similar to the third response message in step S704 in the foregoing embodiment. Details are not described herein again in this application.

It should be noted that, before step S902, the CN device has obtained a status of support for a network slice by the RAN device. Optionally, an embodiment further includes step S905.

S905: The RAN device sends network slice support information to the CN device.

In addition, before step S903, the RAN device has obtained a network slice redirection policy. Optionally, this embodiment further includes step S906.

S906: The CN device sends network slice redirection policy information to the RAN device.

Steps S905 and S906 are respectively similar to steps S806 and S807 in the foregoing embodiment. Details are not described herein again in this application.

Optionally, this embodiment further includes step S907.

S907: The RAN device sends a second AS message to the terminal device. Correspondingly, the terminal device receives the second AS message from the RAN device.

Step S907 is similar to step S706 in the foregoing embodiment. Details are not described herein again in this application.

When the RAN device has a CU-DU split architecture, in this embodiment, interaction between the terminal device and the RAN device is interaction, through a DU, between the terminal device and a CU connected to the DU, and interaction between the RAN device and the CN device is interaction between the CU and the CN device. When the CU is further divided into a CU-CP and a CU-UP, in this embodiment, interaction between the terminal device and the CU is interaction, through the DU, between the terminal device and the CU-CP of the CU connected to the DU, and interaction between the RAN device and the CN device is interaction between the CU-CP and the CN device.

In this embodiment, the CN device may be an AMF, an interface between the RAN device and the CN device may be an NG interface, an interface between the terminal device and the RAN device may be a Uu interface, an interface between the DU and the CU may be an F1 interface, an interface between the DU and the CU-CP may be an F1-C interface, and an interface between the CU/CU-CP and the CN device may be an NG interface.

According to the foregoing steps in this embodiment, when the CN device indicates that network slice redirection needs to be performed, after receiving a request message forwarded by the CN device, the RAN device performs the network slice redirection decision-making and notifies the CN device, so that an appropriate resource can be quickly allocated between the RAN device and the CN device to accept the request of the terminal device. In addition, the CN device first determines whether network slice redirection needs to be performed. This reduces possible signaling overheads. Further, because the terminal device does not need to send an AS stratum request message to the RAN device, backward compatibility for the terminal device is enhanced.

Different from the foregoing implementation, in another possible implementation, network slice redirection is decided by a CN device connected to the terminal device. The CN device is connected to a RAN device to which the serving cell of the terminal device belongs. In this implementation, the CN device detects that the serving cell does not support a network slice requested by the terminal device, and performs the network slice redirection decision-making.

Figure 10:
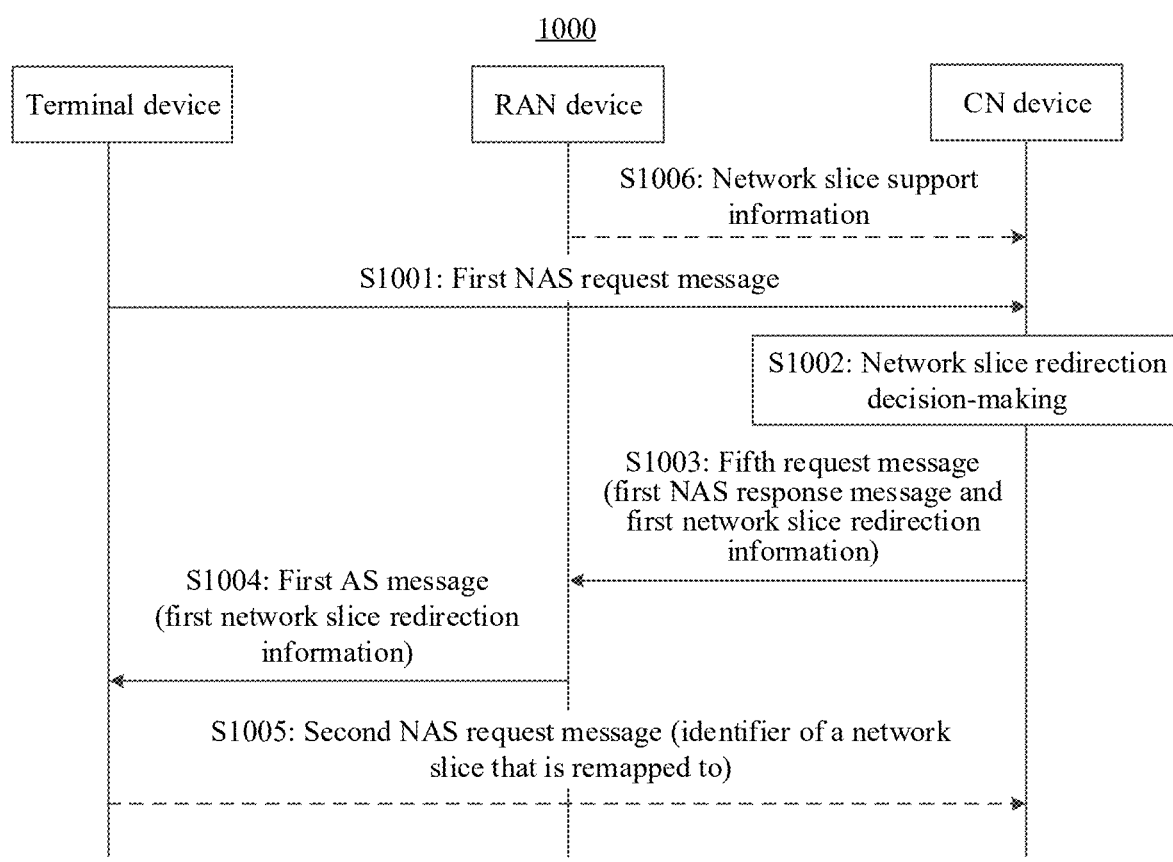
FIG. 10 is a schematic flowchart of yet another network slice redirection method according to an embodiment of this application.

FIG. 10 is a schematic flowchart of a network slice redirection method according to an embodiment of this application. The method 1000 may be applied to interaction between a terminal device, a serving RAN device, and a CN device in a scenario in which the CN device performs network slice redirection decision-making after receiving a request message sent by the terminal device and notifies the terminal device of a decision result. A procedure in FIG. 10 includes the following steps.

S1001: A terminal device sends a first NAS request to a CN device.

Step S1001 is similar to step S601 in the foregoing embodiment. Details are not described herein again in this application.

S1002: The CN device performs network slice redirection decision-making.

In this step, the CN device obtains, from the first NAS request message, a network slice identifier requested by the terminal device. The CN device determines, based on a status that is of support for a network slice by the RAN device and that is obtained by the CN device, that a serving cell does not support or partially supports an original network slice, and performs the network slice redirection decision-making based on a network slice redirection policy.

This step is similar to step S402 in the foregoing embodiments. A difference is as follows: The CN device herein decides to remap a network slice that is in network slices requested by the terminal device and that is not supported by the serving cell to a network slice supported by the serving cell, the CN decides to redirect the terminal device to another cell, or the CN decides to redirect the terminal device to another cell and perform network slice remapping. It should be noted that, before this step, the CN device obtains network slice redirection policy information. Optionally, the network slice redirection policy information may be preconfigured for the CN device, or may be obtained by the CN device from another network device (for example, a network management system), or may be stored in the CN device. How the CN device obtains the network slice redirection policy is not specifically limited in this application.

S1003: The CN device sends a fifth request message to the RAN device. Correspondingly, the RAN device receives the fifth request message from the CN device.

The fifth request message includes a first NAS response message and first network slice redirection information.

The first network slice redirection information in this step is similar to the first network slice redirection information in step S403 in the foregoing embodiment. Details are not described herein again in this application.

Optionally, the fifth request message may be a downlink NAS transport message.

S1004: The RAN device sends a first AS message to the terminal device. The first AS message includes the first NAS response message. The first NAS response message may include the network slice redirection information.

S1005: The terminal device sends a second NAS request message to the CN device.

Steps S1004 and S1005 are respectively similar to steps S604 and S605 in the foregoing embodiment. Details are not described herein again in this application.

It should be noted that, before step S1002, the CN device has obtained a status of support for a network slice by the RAN device. Optionally, an embodiment further includes step S1006.

S1006: The RAN device sends network slice support information to the CN device. Correspondingly, the CN device receives the network slice support information from the RAN device.

When the RAN device has a CU-DU split architecture, in this embodiment, interaction between the terminal device and the RAN device is interaction, through a DU, between the terminal device and a CU connected to the DU, and interaction between the RAN device and the CN device is interaction between the CU and the CN device. When the CU is further divided into a CU-CP and a CU-UP, in this embodiment, interaction between the terminal device and the CU is interaction, through the DU, between the terminal device and the CU-CP of the CU connected to the DU, and interaction between the RAN device and the CN device is interaction between the CU-CP and the CN device.

In this embodiment, the CN device may be an AMF, an interface between the RAN device and the CN device may be an NG interface, an interface between the terminal device and the RAN device may be a Uu interface, an interface between the DU and the CU may be an F1 interface, an interface between the DU and the CU-CP may be an F1-C interface, and an interface between the CU/CU-CP and the CN device may be an NG interface.

According to the foregoing steps in this embodiment, after receiving the request of the terminal device, the CN device performs the network slice redirection decision-making and notifies the terminal device, so that the terminal device may reinitiate the request based on the network slice redirection information. This improves network slice access efficiency. In addition, because the terminal device does not need to send an AS stratum request message to the RAN device, backward compatibility for the terminal device is enhanced.

Figure 11:
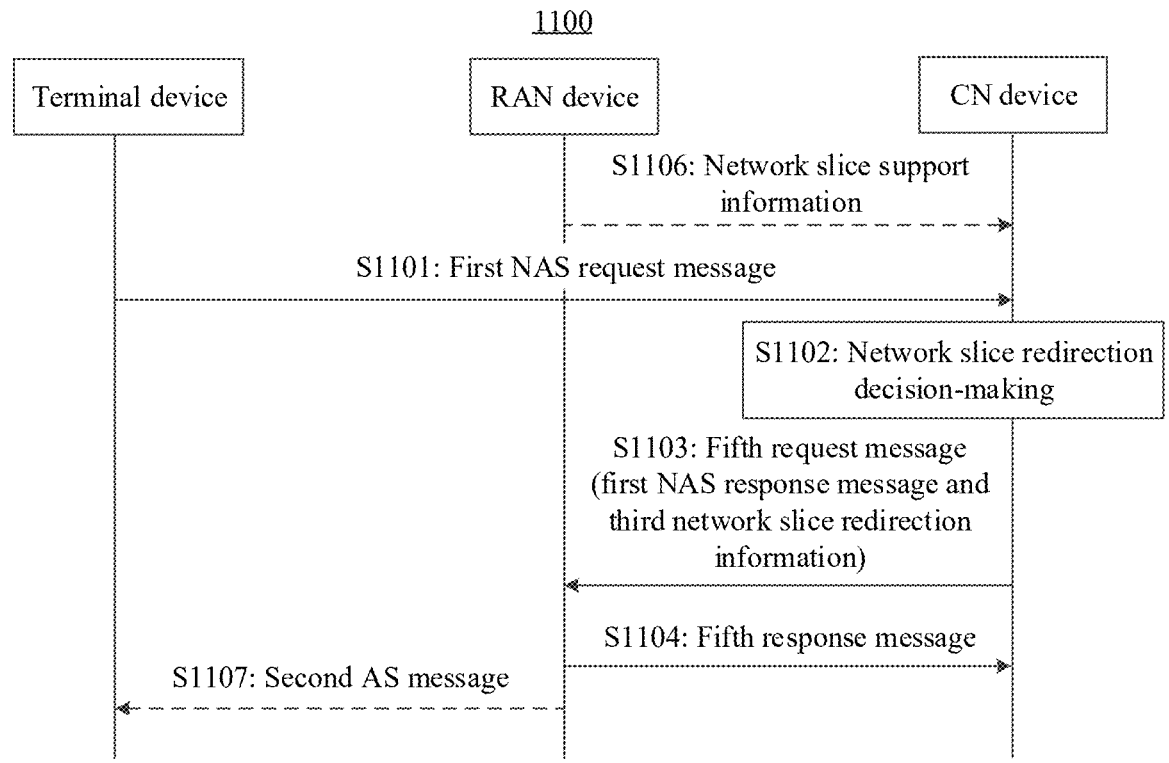
FIG. 11 is a schematic flowchart of yet another network slice redirection method according to an embodiment of this application.

FIG. 11 is a schematic flowchart of yet another network slice redirection method according to an embodiment of this application. The method 1100 may be applied to interaction between a terminal device, a serving RAN device, and a CN device in a scenario in which the CN device performs network slice redirection decision-making after receiving a request message sent by the terminal device and notifies a RAN device of a decision result when the CN device decides to perform network slice remapping. A procedure in FIG. 11 includes the following steps.

S1101: A terminal device sends a first NAS request message to a CN device.

S1102: The CN device performs network slice redirection decision-making.

In this step, the CN device obtains, from the first NAS request message, a network slice identifier requested by the terminal device. The CN device determines, based on a status that is of support for a network slice by a RAN device and that is obtained by the CN device, that a serving cell does not support or partially supports an original network slice, and performs the network slice redirection decision-making based on a network slice redirection policy.

This step is similar to step S402 in the foregoing embodiments. A [main] difference is as follows: The CN device herein decides to remap a network slice that is in network slices requested by the terminal device and that is not supported by the serving cell to a network slice supported by the serving cell. It should be noted that, before this step, the CN device obtains network slice redirection policy information. Optionally, the network slice redirection policy information may be preconfigured for the CN device, or may be obtained by the CN device from another network device (for example, a network management system), or may be stored in the CN device. How the CN device obtains the network slice redirection policy is not specifically limited in this application.

S1103: The CN device sends a fifth request message to the RAN device.

Correspondingly, the RAN device receives the fifth request message from the CN device.

The fifth request message includes a first NAS response message and third network slice redirection information. Specifically, the third network slice redirection information includes network slice remapping information. The network slice remapping information includes an identifier of a network slice to which the original network slice is remapped, or includes a correspondence between the network slice identifier in the first request message and the identifier of the network slice to which the original network slice is remapped.

Optionally, the fifth request message may be a downlink NAS transport message.

S1104: The RAN device sends a fifth response message to the CN device. Correspondingly, the CN device receives the fifth response message from the RAN device. The fifth response message is a response message of the RAN device for the fifth request message.

The fifth response message is used to acknowledge acceptance of the network slice redirection information sent by the CN device.

It should be noted that, before step S1102, the CN device has obtained a status of support for a network slice by the RAN device. Optionally, an embodiment further includes step S1105.

S1105: The RAN device sends network slice support information to the CN device. Correspondingly, the CN device receives the network slice support information from the RAN device.

Optionally, this embodiment further includes step S1107.

S1107: The RAN device sends a second AS message to the terminal device. Correspondingly, the terminal device receives the second AS message from the RAN device.

Step S1107 is similar to step S706 in the foregoing embodiment. Details are not described herein again in this application.

When the RAN device has a CU-DU split architecture, in this embodiment, interaction between the terminal device and the RAN device is interaction, through a DU, between the terminal device and a CU connected to the DU, and interaction between the RAN device and the CN device is interaction between the CU and the CN device. When the CU is further divided into a CU-CP and a CU-UP, in this embodiment, interaction between the terminal device and the CU is interaction, through the DU, between the terminal device and the CU-CP of the CU connected to the DU, and interaction between the RAN device and the CN device is interaction between the CU-CP and the CN device.

In this embodiment, the CN device may be an AMF, an interface between the RAN device and the CN device may be an NG interface, an interface between the terminal device and the RAN device may be a Uu interface, an interface between the DU and the CU may be an F1 interface, an interface between the DU and the CU-CP may be an F1-C interface, and an interface between the CU/CU-CP and the CN device may be an NG interface.

According to the foregoing steps in this embodiment, after receiving the request of the terminal device, the CN device performs network slice remapping decision-making and notifies the RAN device, so that an appropriate resource can be quickly allocated between the RAN device and the CN device to accept the request of the terminal device. In addition, because the terminal device does not need to send an AS stratum request message to the RAN device, backward compatibility for the terminal device is enhanced.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state drive (SSD)), or the like. A person skilled in the art may use different methods to implement the described functions for each particular application, but it should not be considered that the implementation goes beyond the scope of this patent application.

The foregoing describes in detail the method embodiments of this application with reference to FIG. 4 to FIG. 11. The following describes in detail apparatus embodiments of this application with reference to FIG. 12 to FIG. 17. It should be understood that, the apparatus embodiments and the method embodiments correspond to each other, and for a similar description, refer to the method embodiments. It should be noted that, the apparatus embodiments may be used in cooperation with the foregoing methods, or may be separately used.

Figure 12:
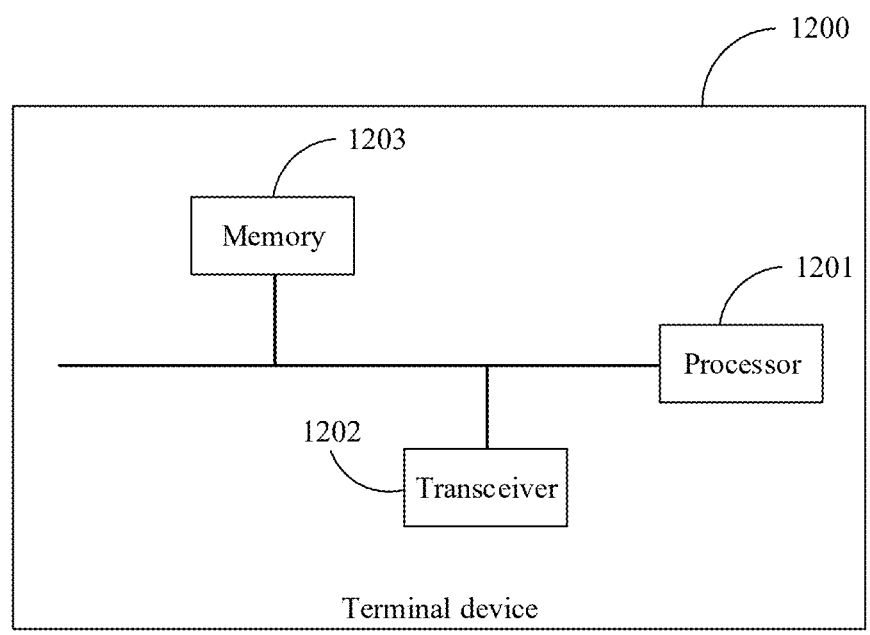
FIG. 12 is a schematic block diagram of a terminal device according to an embodiment of this application.

FIG. 12 is a schematic block diagram of a terminal device 1200 according to an embodiment of this application. The terminal device 1200 may correspond to (for example, may be configured as or may be) the terminal device described in the method 400, the terminal device described in the method 500, the terminal device described in the method 600, the terminal device described in the method 700, the terminal device described in the method 800, the terminal device described in the method 900, the terminal device described in the method 1000, the terminal device described in the method 1100, or a terminal device described in another implementation. The terminal device 1200 may include a processor 1201 and a transceiver 1202. The processor 1201 is communicatively coupled to the transceiver 1202. Optionally, the terminal device 1200 further includes a memory 1203. The memory 1203 is communicatively coupled to the processor 1201. Optionally, the processor 1201, the memory 1203, and the transceiver 1202 may be communicatively coupled. The memory 1203 may be configured to store instructions. The processor 1201 is configured to execute the instructions stored in the memory 1203, to control the transceiver 1202 to receive and/or send information or a signal. The processor 1201 and the transceiver 1202 are separately configured to perform actions or processing processes performed by the terminal device described in the method 400, the terminal device described in the method 500, the terminal device described in the method 600, the terminal device described in the method 700, the terminal device described in the method 800, the terminal device described in the method 900, the terminal device described in the method 1000, the terminal device described in the method 1100, or a terminal device described in another implementation. Herein, to avoid repetition, detailed descriptions are omitted.

Figure 13:
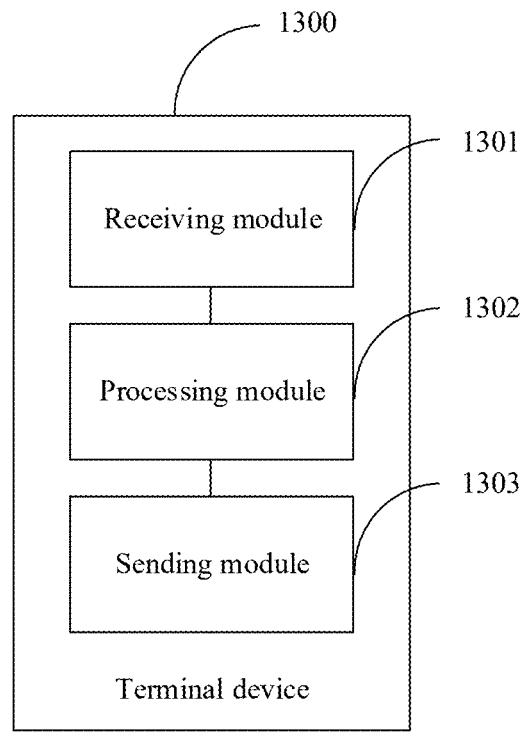
FIG. 13 is another schematic block diagram of a terminal device according to an embodiment of this application.

FIG. 13 is another schematic block diagram of a terminal device 1300 according to an embodiment of this application. The terminal device 1300 may correspond to (for example, may be configured as or may be) the terminal device described in the method 400, the terminal device described in the method 500, the terminal device described in the method 600, the terminal device described in the method 700, the terminal device described in the method 800, the terminal device described in the method 900, the terminal device described in the method 1000, the terminal device described in the method 1100, or a terminal device described in another implementation. The terminal device 1300 may include a receiving module 1301, a processing module 1302, and a sending module 1303. The processing module 1302 is communicatively coupled to the receiving module 1301 and the sending module 1303. The terminal device 1300 may be in a form shown in FIG. 12. The processing module 1302 may be implemented by using the processor 1201 in FIG. 12, and the receiving module 1301 and/or the sending module 1303 may be implemented by using the transceiver 1202 in FIG. 12. The terminal device 1300 may further include a storage unit, configured to store a program or data to be executed by the processing module 1302, or store information received by the receiving module 1301 and/or information sent by the sending module 1303. Modules or units in the terminal device 1300 are separately configured to perform actions or processing processes performed by the terminal device described in the method 400, the terminal device described in the method 500, the terminal device described in the method 600, the terminal device described in the method 700, the terminal device described in the method 800, the terminal device described in the method 900, the terminal device described in the method 1000, the terminal device described in the method 1100, or a terminal device described in another implementation. Herein, to avoid repetition, detailed descriptions are omitted.

Figure 14:
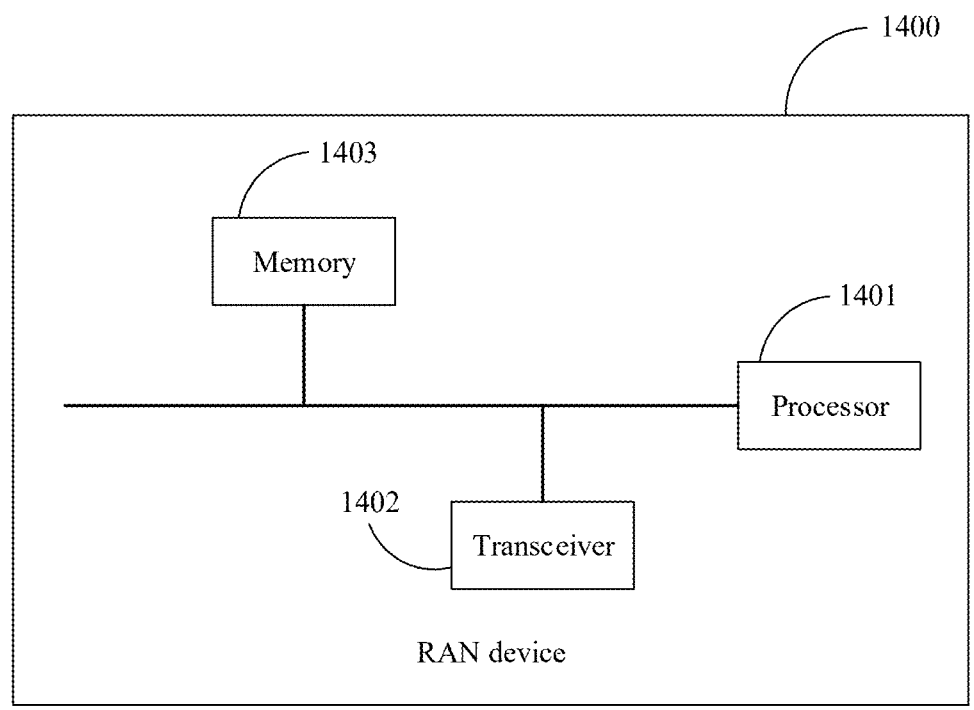
FIG. 14 is a schematic block diagram of a RAN device according to an embodiment of this application.

FIG. 14 is a schematic block diagram of a RAN device 1400 according to an embodiment of this application. The RAN device 1400 may correspond to (for example, may be configured as or may be) the RAN device described in the method 400, the RAN device described in the method 500, the RAN device described in the method 600, the RAN device described in the method 700, the RAN device described in the method 800, the RAN device described in the method 900, the RAN device described in the method 1000, the RAN device described in the method 1100, or a RAN device described in another implementation. The RAN device 1400 may include a processor 1401 and a transceiver 1402. The processor 1401 is communicatively coupled to the transceiver 1402. Optionally, the RAN device 1400 further includes a memory 1403. The memory 1403 is communicatively coupled to the processor 1401. Optionally, the processor 1401, the memory 1403, and the transceiver 1402 may be communicatively coupled. The memory 1403 may be configured to store instructions. The processor 1401 is configured to execute the instructions stored in the memory 1403, to control the transceiver 1402 to receive and/or send information or a signal. The processor 1401 and the transceiver 1402 are separately configured to perform actions or processing processes performed by the RAN device described in the method 400, the RAN device described in the method 500, the RAN device described in the method 600, the RAN device described in the method 700, the RAN device described in the method 800, the RAN device described in the method 900, the RAN device described in the method 1000, the RAN device described in the method 1100, or a RAN device described in another implementation. Herein, to avoid repetition, detailed descriptions are omitted. When the RAN device 1400 has a CU-DU split architecture, the RAN device 1400 shown in FIG. 14 may be a CU or a CU-CP.

Figure 15:
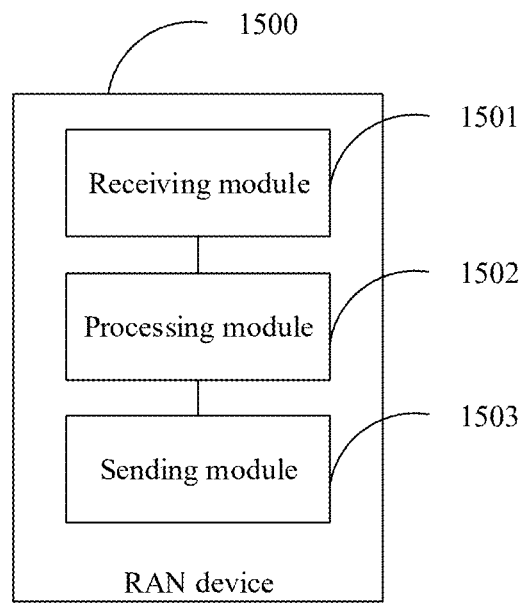
FIG. 15 is another schematic block diagram of a RAN device according to an embodiment of this application.

FIG. 15 is another schematic block diagram of a RAN device 1500 according to an embodiment of this application. The RAN device 1500 may correspond to (for example, may be configured as or may be) the RAN device described in the method 400, the RAN device described in the method 500, the RAN device described in the method 600, the RAN device described in the method 700, the RAN device described in the method 800, the RAN device described in the method 900, the RAN device described in the method 1000, the RAN device described in the method 1100, or a RAN device described in another implementation. The RAN device 1500 may include a receiving module 1501, a processing module 1502, and a sending module 1503. The processing module 1502 is communicatively coupled to the receiving module 1501 and the sending module 1503. The RAN device 1500 may be in a form shown in FIG. 14. The processing module 1502 may be implemented by using the processor 1401 in FIG. 14, and the receiving module 1501 and/or the sending module 1503 may be implemented by using the transceiver 1402 in FIG. 14. The RAN device 1500 may further include a storage unit, configured to store a program or data to be executed by the processing module 1502, or store information received by the receiving module 1501 and/or information sent by the sending module 1503. Modules or units in the RAN device 1500 are separately configured to perform actions or processing processes performed by the RAN device described in the method 400, the RAN device described in the method 500, the RAN device described in the method 600, the RAN device described in the method 700, the RAN device described in the method 800, the RAN device described in the method 900, the RAN device described in the method 1000, the RAN device described in the method 1100, or a RAN device described in another implementation. Herein, to avoid repetition, detailed descriptions are omitted. When the RAN device 1500 has a CU-DU split architecture, the RAN device 1500 shown in FIG. 15 may be a CU or a CU-CP.

Figure 16:
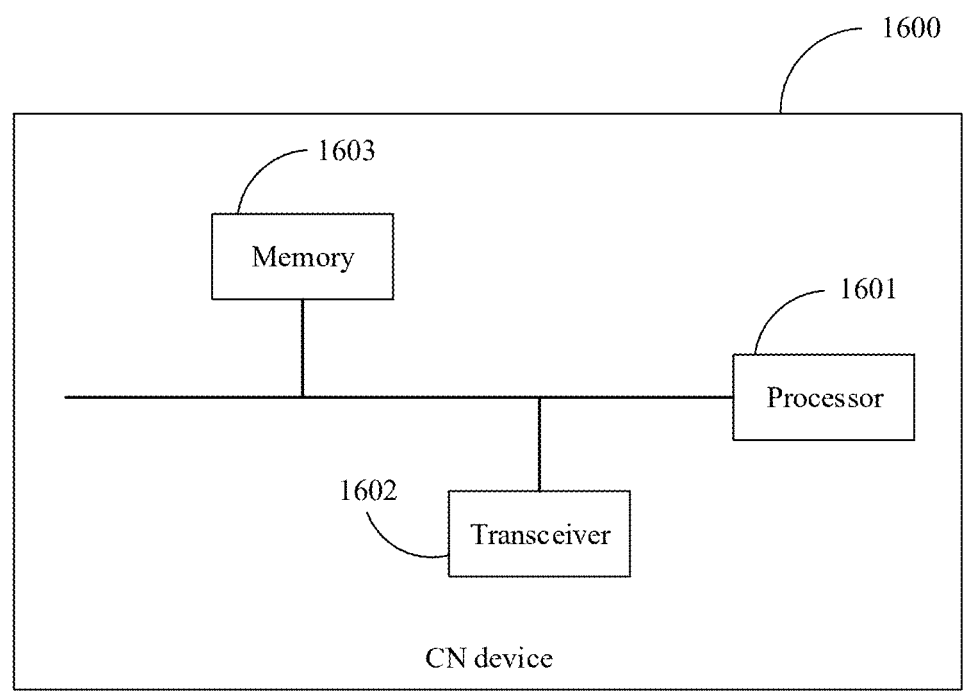
FIG. 16 is a schematic block diagram of a CN device according to an embodiment of this application.

FIG. 16 is a schematic block diagram of a CN device 1600 according to an embodiment of this application. The CN device 1600 may correspond to (for example, may be configured as or may be) the CN device described in the method 400, the CN device described in the method 500, the CN device described in the method 600, the CN device described in the method 700, the CN device described in the method 800, the CN device described in the method 900, the CN device described in the method 1000, the CN device described in the method 1100, or a CN device described in another implementation. The CN device 1600 may include a processor 1601 and a transceiver 1602. The processor 1601 is communicatively coupled to the transceiver 1602. Optionally, the CN device 1600 further includes a memory 1603. The memory 1603 is communicatively coupled to the processor 1601. Optionally, the processor 1601, the memory 1603, and the transceiver 1602 may be communicatively coupled. The memory 1603 may be configured to store instructions. The processor 1601 is configured to execute the instructions stored in the memory 1603, to control the transceiver 1602 to receive and/or send information or a signal. The processor 1601 and the transceiver 1602 are separately configured to perform actions or processing processes performed by the CN device described in the method 400, the CN device described in the method 500, the CN device described in the method 600, the CN device described in the method 700, the CN device described in the method 800, the CN device described in the method 900, the CN device described in the method 1000, the CN device described in the method 1100, or a CN device described in another implementation. Herein, to avoid repetition, detailed descriptions are omitted.

Figure 17:
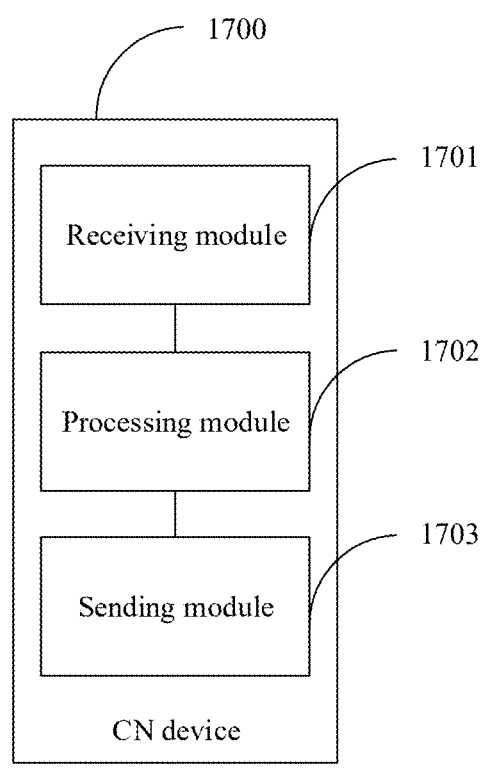
FIG. 17 is another schematic block diagram of a CN device according to an embodiment of this application.

FIG. 17 is another schematic block diagram of a CN device 1700 according to an embodiment of this application. The CN device 1700 may correspond to (for example, may be configured as or may be) the CN device described in the method 400, the CN device described in the method 500, the CN device described in the method 600, the CN device described in the method 700, the CN device described in the method 800, the CN device described in the method 900, the CN device described in the method 1000, the CN device described in the method 1100, or a CN device described in another implementation. The CN device 1700 may include a receiving module 1701, a processing module 1702, and a sending module 1703. The processing module 1702 is communicatively coupled to the receiving module 1701 and the sending module 1703. The CN device 1700 may be in a form shown in FIG. 16. The processing module 1702 may be implemented by using the processor 1601 in FIG. 16, and the receiving module 1701 and/or the sending module 1703 may be implemented by using the transceiver 1602 in FIG. 16. The CN device 1700 may further include a storage unit, configured to store a program or data to be executed by the processing module 1702, or store information received by the receiving module 1701 and/or information sent by the sending module 1703. Modules or units in the CN device 1700 are separately configured to perform actions or processing processes performed by the CN device described in the method 400, the CN device described in the method 500, the CN device described in the method 600, the CN device described in the method 700, the CN device described in the method 800, the CN device described in the method 900, the CN device described in the method 1000, the CN device described in the method 1100, or a CN device described in another implementation. Herein, to avoid repetition, detailed descriptions are omitted.

It should be understood that the processor (1201, 1401, 1601) in the apparatus embodiments of this application may be a central processing unit (central processing unit, CPU), a network processor (network processor, NP), a hardware chip, or any combination thereof. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

The memory (1203, 1403, 1603) in the apparatus embodiments of this application may be a volatile memory (volatile memory), for example, a random access memory (random-access memory, RAM); or may be a non-volatile memory (non-volatile memory), for example, a read-only memory (read-only memory, ROM), a flash memory (flash memory), a hard disk drive (hard disk drive, HDD), or a solid-state drive (solid-state drive, SSD); or may be a combination of the foregoing types of memories.

In the several embodiments provided in this application, it should be understood that the disclosed apparatus and method may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication couplings may be implemented through some interfaces. The indirect couplings or communication couplings between the apparatuses or units may be implemented in electrical, mechanical, or other forms.

The units described as separate parts may or may not be physically separate, and parts displayed as units may or may not be physical units, in other words, may be located in one place, or may be distributed on a plurality of network units. Some or all of the units may be selected based on actual requirements to achieve the objectives of the solutions of embodiments.

In addition, function units in embodiments of this patent application may be integrated into one processing unit, or each of the units may exist alone physically, or two or more units may be integrated into one unit.

When functions are implemented in a form of a software function unit and sold or used as an independent product, the functions may be stored in a computer-readable storage medium. Based on such an understanding, the technical solutions of this patent application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this patent application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this patent application, but are not intended to limit the protection scope of this patent application. Any variation or replacement readily figured out by a person skilled in the art within the technical scope disclosed in this patent application shall fall within the protection scope of this patent application. Therefore, the protection scope of this patent application shall be subject to the protection scope of the claims.

What is claimed is:

1. A network slice redirection method, comprising:
   receiving, by a radio access network (RAN) device, a first message, wherein the first message comprises identifiers of one or more first network slices, and the identifiers of the one or more first network slices are the same as identifiers that are of the one or more first network slices and that are comprised in a first non-access stratum (NAS) request message sent by a terminal device to a core network (CN) device by using the RAN device; and
   sending, by the RAN device, a second message to the terminal device, wherein the second message comprises network slice redirection information, the network slice redirection information comprises at least one of network slice remapping information or terminal device redirection information, the network slice redirection information is obtained after the RAN device performs network slice redirection decision-making on the one or more first network slices, and the first NAS request message is received by the RAN device prior to the sending of the second message comprising the network slice redirection information.

2. The method according to claim 1, wherein the network slice remapping information comprises at least one of the following: identifiers of one or more second network slices to which the one or more first network slices are remapped, correspondences between the identifiers of the one or more first network slices and the identifiers of the one or more second network slices that are remapped to, the identifiers of the one or more second network slices and a priority of each second network slice, timer information of the one or more second network slices, or the identifiers of the one or more second network slices and the timer information corresponding to each second network slice.

3. The method according to claim 1, wherein the terminal device redirection information comprises at least one of the following: an identifier of a cell to which the terminal device is redirected, information about a carrier to which the terminal device is redirected, the information about the carrier to which the terminal device is redirected and the identifier of the cell, or an identifier of an area to which the terminal device is redirected.

4. The method according to claim 1, wherein the method further comprises:
   performing, by the RAN device, the network slice redirection decision-making based on a network slice redirection policy, wherein
   the network slice redirection policy comprises at least one of network slice remapping or terminal device redirection.

5. The method according to claim 1, wherein the first message is sent by the terminal device, and comprises the first NAS request message and the identifiers of the one or more first network slices.

6. The method according to claim 1, wherein the first message is sent by the CN device, and comprises a response message for the first NAS request message and the identifiers of the one or more first network slices.

7. The method according to claim 1, wherein the method further comprises at least one of:
   receiving, by the RAN device, a second NAS request message sent by the terminal device, wherein the second NAS request message comprises identifiers of one or more second network slices, or the identifiers of the one or more first network slices and the identifiers of the one or more second network slices; or
   obtaining, by the RAN device, network slice redirection policy information from the CN device.

8. A network slice redirection method, comprising:
   sending, by a terminal device, a first request message, wherein the first request message comprises identifiers of one or more first network slices, and the identifiers of the one or more first network slices are the same as identifiers that are of the one or more first network slices and that are comprised in a first non-access stratum (NAS) request message sent by the terminal device to a core network (CN) device by using a radio access network (RAN) device; and
   receiving, by the terminal device, a second message from the RAN device, wherein the second message comprises network slice redirection information, the network slice redirection information comprises at least one of network slice remapping information or terminal device redirection information, and the first NAS request message is sent prior to the receiving of the second message comprising the network slice redirection information.

9. The method according to claim 8, wherein the network slice remapping information comprises at least one of the following: identifiers of one or more second network slices to which the one or more first network slices are remapped, correspondences between the identifiers of the one or more first network slices and the identifiers of the one or more second network slices that are remapped to, the identifiers of the one or more second network slices and a priority of each second network slice, timer information of the one or more second network slices, or the identifiers of the one or more second network slices and the timer information corresponding to each second network slice.

10. The method according to claim 8, wherein the terminal device redirection information comprises at least one of the following: an identifier of a cell to which the terminal device is redirected, information about a carrier to which the terminal device is redirected, the information about the carrier to which the terminal device is redirected and the identifier of the cell, or an identifier of an area to which the terminal device is redirected.

11. The method according to claim 8, wherein the sending, by the terminal device, the first request message comprises: sending, by the terminal device, the first request message to the RAN device, wherein the first message comprises the first NAS request message and the identifiers of the one or more first network slices; or sending, by the terminal device, the first request message to the CN device, wherein the first message comprises the first NAS request message.

12. The method according to claim 8, wherein the second message further comprises a response message for the first NAS request message.

13. The method according to claim 8, wherein the method further comprises: sending, by the terminal device, a second NAS request message to the RAN device, wherein the second NAS request message comprises identifiers of one or more second network slices, or the identifiers of the one or more first network slices and the identifiers of the one or more second network slices.

14. A communication apparatus, comprising:
at least one processor; and
one or more memories coupled to the at least one processor and storing program instructions for execution by the at least one processor to:
receive a first message, wherein the first message comprises identifiers of one or more first network slices, and the identifiers of the one or more first network slices are the same as identifiers that are of the one or more first network slices and that are comprised in a first non-access stratum (NAS) request message sent by a terminal device to a core network (CN) device by using the communication apparatus; and
send a second message to the terminal device, wherein the second message comprises network slice redirection information, the network slice redirection information comprises at least one of network slice remapping information or terminal device redirection information, the network slice redirection information is obtained after the communication apparatus performs network slice redirection decision-making on the one or more first network slices, and the first NAS request message is received by the communication apparatus prior to the sending of the second message comprising the network slice redirection information.

15. The communication apparatus according to claim 14, wherein the network slice remapping information comprises at least one of the following: identifiers of one or more second network slices to which the one or more first network slices are remapped, correspondences between the identifiers of the one or more first network slices and the identifiers of the one or more second network slices that are remapped to, the identifiers of the one or more second network slices and a priority of each second network slice, timer information of the one or more second network slices, or the identifiers of the one or more second network slices and the timer information corresponding to each second network slice.

16. The communication apparatus according to claim 14, wherein the terminal device redirection information comprises at least one of the following: an identifier of a cell to which the terminal device is redirected, information about a carrier to which the terminal device is redirected, the information about the carrier to which the terminal device is redirected and the identifier of the cell, or an identifier of an area to which the terminal device is redirected.

17. The communication apparatus according to claim 14, wherein the program instructions, when executed, further cause the one or more processors to:
perform the network slice redirection decision-making based on a network slice redirection policy, wherein the network slice redirection policy comprises at least one of network slice remapping or terminal device redirection.

18. The communication apparatus according to claim 14, wherein the receiving the first message comprises: receiving the first message sent by the terminal device, wherein the first message comprises the first NAS request message and the identifiers of the one or more first network slices.

19. The communication apparatus according to claim 14, wherein the receiving the first message comprises: receiving the first message sent by the CN device, wherein the first message comprises a response message for the first NAS request message and the identifiers of the one or more first network slices.

20. The communication apparatus according to claim 14, wherein the program instructions further cause the one or more processors to:
receive a second NAS request message sent by the terminal device, wherein the second NAS request message comprises identifiers of one or more second network slices, or the identifiers of the one or more first network slices and the identifiers of the one or more second network slices; or
obtain network slice redirection policy information from the CN device.

* * * * *